(12) United States Patent
Bishop et al.

(10) Patent No.: US 8,615,773 B2
(45) Date of Patent: Dec. 24, 2013

(54) SYSTEMS AND METHODS FOR COORDINATING COMPUTING FUNCTIONS TO ACCOMPLISH A TASK USING A CONFIGURATION FILE AND STANDARDIZED EXECUTABLE APPLICATION MODULES

(75) Inventors: Douglas L. Bishop, Phoenix, AZ (US); Jeff Vanderzweep, Peoria, AZ (US); Tim Felke, Glendale, AZ (US); Douglas Allen Bell, Peoria, AZ (US); Issa Aljanabi, Ann Arbor, MI (US)

(73) Assignee: Honeywell International Inc., Morristown, NJ (US)

( * ) Notice: Subject to any disclaimer, the term of this patent is extended or adjusted under 35 U.S.C. 154(b) by 234 days.

(21) Appl. No.: 13/077,276

(22) Filed: Mar. 31, 2011

(65) Prior Publication Data

US 2012/0254876 A1   Oct. 4, 2012

(51) Int. Cl.
*G06F 3/00* (2006.01)

(52) U.S. Cl.
USPC .......................................................... 719/318

(58) Field of Classification Search
None
See application file for complete search history.

(56) References Cited

U.S. PATENT DOCUMENTS

| | | | |
|---|---|---|---|
| 4,047,162 A | 9/1977 | Dorey et al. | |
| 4,296,409 A | 10/1981 | Whitaker et al. | |
| 4,890,284 A | 12/1989 | Murphy et al. | |
| 5,020,135 A | 5/1991 | Kasparian et al. | |
| 5,086,429 A | 2/1992 | Gray et al. | |
| 5,550,736 A | 8/1996 | Hay et al. | |
| 5,754,823 A * | 5/1998 | Mudryk et al. | 710/8 |
| 5,881,270 A | 3/1999 | Worthington et al. | |
| 5,884,077 A * | 3/1999 | Suzuki | 718/105 |
| 5,941,918 A | 8/1999 | Blosser | |
| 6,094,609 A | 7/2000 | Arjomand | |
| 6,128,560 A | 10/2000 | Ishii | |

(Continued)

FOREIGN PATENT DOCUMENTS

| | | |
|---|---|---|
| EP | 1933563 A1 | 6/2008 |
| EP | 2482159 A2 | 8/2012 |
| EP | 2527977 A2 | 11/2012 |
| WO | 2005025194 A1 | 3/2005 |

OTHER PUBLICATIONS

Integrated Vehicle Health Management (IVHM), Coalition Solutions Integrated, Inc.—Products & Services, pp. 1-2.

(Continued)

*Primary Examiner* — Emerson Puente
*Assistant Examiner* — Adam Lee
(74) *Attorney, Agent, or Firm* — Ingrassia Fisher & Lorenz, P.C.

(57) ABSTRACT

Systems and Methods are provided for coordinating computing functions to accomplish a task. The system includes a plurality of standardized executable application modules (SEAMs), each of which is configured to execute on a processor to provide a unique function and to generate an event associated with its unique function. The system includes a configuration file that comprises a dynamic data store (DDS) and a static data store (SDS). The DDS includes an event queue and one or more response queues. The SDS includes a persistent software object that is configured to map a specific event from the event queue to a predefined response record and to indicate a response queue into which the predefined response record is to be placed. The system further includes a workflow service module, the work flow service module being configured to direct communication between the SDS, the DDS and each of the plurality of SEAMs.

20 Claims, 13 Drawing Sheets

(56) References Cited

U.S. PATENT DOCUMENTS

| | | | |
|---|---|---|---|
| 6,185,613 B1 | 2/2001 | Lawson et al. | |
| 6,401,098 B1 | 6/2002 | Moulin | |
| 6,434,455 B1 | 8/2002 | Snow et al. | |
| 6,438,470 B1 | 8/2002 | Hiramatsu | |
| 6,493,616 B1 | 12/2002 | Rossow et al. | |
| 6,615,090 B1 | 9/2003 | Blevins et al. | |
| 6,624,909 B1 | 9/2003 | Czyszczewski et al. | |
| 6,728,611 B2 | 4/2004 | Kamiya | |
| 6,757,897 B1* | 6/2004 | Shi et al. | 718/102 |
| 6,766,230 B1 | 7/2004 | Rizzoni et al. | |
| 6,789,007 B2 | 9/2004 | Ellis et al. | |
| 6,823,512 B1* | 11/2004 | Miller et al. | 718/103 |
| 6,832,141 B2 | 12/2004 | Skeen et al. | |
| 6,904,483 B2* | 6/2005 | Koning et al. | 710/244 |
| 6,910,156 B2 | 6/2005 | Adam | |
| 6,928,358 B2 | 8/2005 | Brooks et al. | |
| 6,937,926 B2 | 8/2005 | Lipscomb et al. | |
| 6,950,782 B2 | 9/2005 | Qiao et al. | |
| 7,065,050 B1 | 6/2006 | Herbst | |
| 7,072,879 B2 | 7/2006 | Soemo et al. | |
| 7,079,984 B2 | 7/2006 | Eryurek et al. | |
| 7,142,953 B2 | 11/2006 | Marshall et al. | |
| 7,188,207 B2 | 3/2007 | Mitter | |
| 7,209,817 B2 | 4/2007 | Abdel-Malek et al. | |
| 7,222,800 B2 | 5/2007 | Wruck | |
| 7,237,223 B2 | 6/2007 | Leu et al. | |
| 7,272,475 B2 | 9/2007 | Gawlik et al. | |
| 7,295,903 B2 | 11/2007 | Siebel et al. | |
| 7,319,947 B1 | 1/2008 | Khaira et al. | |
| 7,349,825 B1 | 3/2008 | Williams et al. | |
| 7,363,420 B2 | 4/2008 | Lin et al. | |
| 7,379,799 B2 | 5/2008 | Cleary et al. | |
| 7,379,845 B2 | 5/2008 | Gorinevsky et al. | |
| 7,444,216 B2 | 10/2008 | Rogers et al. | |
| 7,493,482 B2 | 2/2009 | Ring et al. | |
| 7,522,979 B2 | 4/2009 | Pillar | |
| 7,523,133 B2 | 4/2009 | Mackie | |
| 7,593,403 B2 | 9/2009 | Kalkunte et al. | |
| 7,596,785 B2 | 9/2009 | Burkhardt et al. | |
| 7,606,843 B2 | 10/2009 | Alexander et al. | |
| 7,617,029 B2 | 11/2009 | Loda | |
| 7,710,871 B2 | 5/2010 | Lavian et al. | |
| 7,757,120 B2 | 7/2010 | Ogle et al. | |
| 7,761,201 B2 | 7/2010 | Avery et al. | |
| 7,779,039 B2 | 8/2010 | Weissman et al. | |
| 7,929,562 B2 | 4/2011 | Petrovykh | |
| 7,950,017 B1* | 5/2011 | Cain et al. | 719/310 |
| 7,990,857 B2 | 8/2011 | Jain et al. | |
| 8,054,208 B2 | 11/2011 | Fletcher et al. | |
| 8,135,995 B2 | 3/2012 | Ngai et al. | |
| 8,145,444 B1 | 3/2012 | Bickford et al. | |
| 8,151,141 B1 | 4/2012 | Bennett et al. | |
| 8,180,594 B2 | 5/2012 | Stephan | |
| 8,214,317 B2 | 7/2012 | Aguilar et al. | |
| 8,265,980 B2 | 9/2012 | Ochs et al. | |
| 8,468,601 B1 | 6/2013 | Bakhmutov | |
| 8,533,536 B2 | 9/2013 | Yan et al. | |
| 2002/0004694 A1 | 1/2002 | Mcleod et al. | |
| 2002/0007237 A1 | 1/2002 | Phung et al. | |
| 2002/0023118 A1* | 2/2002 | Peled et al. | 709/104 |
| 2002/0095597 A1 | 7/2002 | Norden et al. | |
| 2004/0117791 A1* | 6/2004 | Prasad et al. | 718/100 |
| 2005/0038581 A1 | 2/2005 | Kapolka et al. | |
| 2005/0060396 A1 | 3/2005 | Hirooka | |
| 2006/0095394 A1 | 5/2006 | Miller et al. | |
| 2007/0010923 A1 | 1/2007 | Rouyre | |
| 2007/0022403 A1 | 1/2007 | Brandt et al. | |
| 2007/0050719 A1 | 3/2007 | Lui et al. | |
| 2007/0100520 A1 | 5/2007 | Shah et al. | |
| 2007/0124189 A1 | 5/2007 | Stoughton et al. | |
| 2007/0226540 A1 | 9/2007 | Konieczny | |
| 2008/0098351 A1 | 4/2008 | Weatherhead et al. | |
| 2008/0119981 A1 | 5/2008 | Chen | |
| 2008/0125877 A1 | 5/2008 | Miller et al. | |
| 2008/0125933 A1 | 5/2008 | Williams et al. | |
| 2009/0138139 A1 | 5/2009 | Tsai et al. | |
| 2009/0138141 A1 | 5/2009 | Nwadiogbu et al. | |
| 2009/0228519 A1 | 9/2009 | Purcell et al. | |
| 2009/0249215 A1 | 10/2009 | Paek | |
| 2009/0265055 A1 | 10/2009 | Gillies | |
| 2009/0289756 A1 | 11/2009 | Raichle et al. | |
| 2009/0295559 A1 | 12/2009 | Howell et al. | |
| 2010/0005470 A1* | 1/2010 | Simon et al. | 718/103 |
| 2010/0042283 A1 | 2/2010 | Kell et al. | |
| 2010/0043003 A1* | 2/2010 | Valdez et al. | 718/103 |
| 2010/0131241 A1 | 5/2010 | Dal Bello et al. | |
| 2010/0192005 A1 | 7/2010 | Das et al. | |
| 2010/0217479 A1 | 8/2010 | Dahl et al. | |
| 2010/0217638 A1 | 8/2010 | Dickson et al. | |
| 2010/0281119 A1* | 11/2010 | Durai | 709/206 |
| 2011/0010130 A1 | 1/2011 | Hadden et al. | |
| 2011/0023079 A1 | 1/2011 | Schultz et al. | |
| 2011/0060946 A1 | 3/2011 | Gupta et al. | |
| 2011/0077817 A1 | 3/2011 | Sun et al. | |
| 2011/0118905 A1 | 5/2011 | Mylaraswamy et al. | |
| 2011/0191099 A1* | 8/2011 | Farmaner et al. | 704/9 |
| 2012/0023499 A1* | 1/2012 | Biran et al. | 718/103 |
| 2012/0079005 A1* | 3/2012 | Dent et al. | 709/203 |
| 2012/0198220 A1 | 8/2012 | Felke | |
| 2012/0272099 A1 | 10/2012 | Keith, Jr. | |
| 2013/0023203 A1 | 1/2013 | Kakaire | |

OTHER PUBLICATIONS

Fletcher, et al.; Re-Configurable Multipurpose Digital Interface, Filed with the USPTO on Apr. 27, 2010 and assigned U.S. Appl. No. 12/768,448.

Fletcher, et al.; Re-Configurable Multipurpose Analog Interface, Filed with the USPTO on Mar. 30, 2010 and assigned U.S. Appl. No. 12/750,341.

Goldstein, et al.; Vehicle System Monitoring and Communications Architecture, Filed with the USPTO on Jun. 29, 2009 and assigned U.S. Appl. No. 12/493,750.

Felke, et al.; Methods and Reconfigurable Systems to Optimize the Performance of a Condition Based Health Maintenance System, Filed with the USPTO on Jan. 28, 2011 and assigned U.S. Appl. No. 13/016,601.

Van Der Zweep, et al.; Systems and Methods to Configure Condition Based Health Maintenance Systems, Filed with the USPTO on May 25, 2011 and assigned U.S. Appl. No. 13/115,690.

Bell, et al.; Methods and Systems for Distributed Diagnostic Reasoning, Filed with the USPTO on Oct. 14, 2011, and assigned U.S. Appl. No. 13/273,984.

Bishop, et al.; Systems and Methods for Augmenting the Functionality of a Monitoring Node without Recompiling, Filed with the USPTO on May 22, 2012 and assigned U.S. Appl. No. 13/477,735.

Bishop, D. L.: Systems and Methods for Limiting User Customization of Task Workflow in a Condition Based Health Maintenance System, filed with the USPTO on Aug. 10, 2012 and assigned U.S. Appl. No. 13/572,518.

Bell, D. A., et al.: "Method for Performing Condition Based Data Acquisition in a Hierarchically Distributed Condition Based Maintenance System" filed with the USPTO on Sep. 28, 2012 and assigned U.S. Appl. No. 13/630,906.

EP Search Report dated Feb. 7, 2013 for EP 12 187 309.5.

EP Office Action dated Feb. 19, 2013 for EP 12 187 309.5.

Bishop D.L., et al; Systems and Methods for Coordinating Computing Functions to Accomplish a Task, Filing date Jun. 14, 2013, U.S. Appl. No. 13/918,584.

USPTO Office Action for U.S. Appl. No. 13/115,690 dated Jun. 7, 2013.

Coalition Solutions Integrated, Inc.—Information Technology (IT); URL: http://coalitionsolutions.com/products2.html; retrieved from the internet on Dec. 7, 2010.

USPTO Office Action for U.S. Appl. No. 13/273,984 dated Nov. 4, 2013.

USPTO office action for U.S. Appl. No. 13/016,601 dated Nov. 8, 2013.

* cited by examiner

| Attribute | Value |
|---|---|
| ID | |
| Common_Key | ASM 158 CBMCOE Test-AUTH-AUTH KG |
| Name | VHM Controller |
| IndirectAssemblies | 1) Actuator Controller<br>2) Valve Controller<br>3) Pressure Sensor 1<br>4) Hydraulic Pump<br>5) Hydraulic Pump Motor<br>6) 28V Power Distribution System<br>7) Pressure Sensor 2<br>8) Hydraulic Actuator |
| SourceAssembly | |
| ReportedSymptom | 1) Actuator Controller Not Receiving Actuator_Cmnd From External System<br>2) Pump Motor Electrical Degradation Symptom<br>3) Pump High Pressure Supply 1 SignalNoisy<br>4) Pump High Pressure Supply 2 SignalNoisy<br>5) Set Pressure Sensor Assembly 2, is not sending data<br>6) Set Pressure Sensor Assembly 2, is not sending data, no power<br>7) measured pump speed at the output shaft in rpm<br>8) Actuator Response Slow Mechanical Symptom<br>9) Pressure Sensor 1 - Pressure Sensor 2 Miscompare<br>10) Valve Leakage Mechanical Symptom |

Current Version: VHM_3_2_2_6

Entity Assembly

Common_files -- Assembly: Showing 12 of 12

Current Assembly: VHM Controller

Delta Does not Exist

Instructions:
1. Inspection Not Required

○ Not Reviewed  ● Approved  ○ Rejected   Comments History | Comments Not Available.

500 http://129.239.16.130:8080/?action=ShowRecord&RecCat=VHM_3_2_2_6 | Common_Files | Assembly&Common – Windows Internet Explorer ◁ ▷ Prev Next ▷

Current Assembly: VHM Controller
◁ ▷ Common_files — Assembly. Showing 12 of 12
Entity: Assembly                                              Delta Does not Exist
Current Version: VHM_3_2_2_6

| | |
|---|---|
| SourceAssembly | |
| ReportedSymptom | 1) Actuator Controller Not Receiving Actuator Cmd From External System<br>2) Pump Motor Electrical Degradation Symptom<br>3) Pump High Pressure Supply 1 SignalNoisy<br>4) Pump High Pressure Supply 2 SignalNoisy<br>5) Set Pressure Sensor Assembly 2 s not sending data<br>6) Set Pressure Sensor Assembly 2 s not sending data, no power.<br>7) measured pump speed at the output shaft in can<br>8) Actuator Response Slow Mechanical Symptom<br>9) Pressure Sensor 1 – Pressure Sensor 2 Miscompare<br>10) Valve Leakage Mechanical Symptom  502 |
| AssemblyCode | 15 |
| CBMicommType | No Comm |
| HWproticalType | None |
| SendsMessages | 1) VHM Discrete Data To CA-CBM<br>2) VHM Periodic Status Report To Maintainer  601 |
| ReceivesMessages | 1) AHM Periodic Status Report To VHM<br>2) Pressure Controller Periodic Status Report To VHM<br>3) VHM Discrete Data To CA-CBM  602 |
| AllowedRoles | 1) Technician<br>2) Fleet Manager |
| Hierarchy | Health Management |

Instructions
1. Inspection Not Required

○ Not Reviewed   ● Approved   ○ Rejected
Comments History | Comments Not Available.

SYSTEMS AND METHODS FOR COORDINATING COMPUTING FUNCTIONS TO ACCOMPLISH A TASK USING A CONFIGURATION FILE AND STANDARDIZED EXECUTABLE APPLICATION MODULES

TECHNICAL FIELD

The present invention generally relates to architectures for condition based health maintenance systems, and more particularly relates to systems and methods by which various combinations of computing functions may be operated in combination to accomplish a particular task within the condition based health maintenance system.

BACKGROUND

Increases in vehicle complexity and the accompanying increase in maintenance costs have led to industry wide investments into the area of condition based health maintenance (CBM). These efforts have led to the development of industry or equipment specific process solutions. However, conventional CBM systems are generally rigidly configured, which can result in cumbersome performance or users pay significant modification costs.

FIG. 1 is a simplified block diagram of an exemplary multi-level health maintenance process 10 that may be useful in monitoring a complex system (not shown). A complex system as discussed herein may be any type of vehicle, aircraft, manufacturing process, or machine that may utilize sensors, transducers or other data sources to monitor the various components and parameters of the complex system. The sensors/transducers are typically situated at the component or the process measurement level 20 to measure, collect and communicate raw data through a variety of data driven input/output (I/O) devices. This raw data may represent fault indicators, parametric values, process status and events, consumable usage and status, interactive data and the like. Non-limiting examples of other data sources may include serial data files, video data files, audio data files and built in test equipment.

Once the parameters of the complex system are measured, the measurement data is typically forwarded to more sophisticated devices and systems at an extraction level 30 of processing. At the extraction level 30, higher level data analysis and recording may occur such as the determination or derivation of trend and other symptom indicia.

Symptom indicia are further processed and communicated to an interpretation level 40 where an appropriately programmed computing device may diagnose, prognosticate default indications or track consumable usage and consumption. Raw material and other usage data may also be determined and tracked.

Data synthesized at the interpretation level 40 may then be compiled and organized by maintenance planning, analysis and coordination software applications at an action level 50 for reporting and other interactions with a variety of users at an interaction level 60.

Although processes required to implement a CBM system are becoming more widely known, the level of complexity of a CBM system remains high and the cost of developing these solutions is commensurately high. Attempts to produce an inexpensive common CBM solution that is independent from the design of the complex system that is being monitored have been less than satisfying. This is so because the combination and permutations of the ways in which a complex system can fail and the symptoms by which the failures are manifested are highly dependent on the system design.

Accordingly, it is desirable to develop a health maintenance system architecture that is sufficiently flexible to support a range of complex systems. In addition, it is desirable to develop a health maintenance system that may be easily reconfigured by a user in real time, thus dispensing with prohibitive reprogramming costs and delays. Furthermore, other desirable features and characteristics of the present invention will become apparent from the subsequent detailed description of the invention and the appended claims, taken in conjunction with the accompanying drawings and this background of the invention.

BRIEF SUMMARY

A system is provided for coordinating functions within a computing device to accomplish a task. The system includes a plurality of standardized executable application modules (SEAMs). Each SEAM contains instructions to perform one of a plurality of different standardized functions. The term "standardized" as used herein with regard to an executable application that has not been provided with specific direction and data to execute a specific task. Each SEAM is configured to execute on a processor to provide a unique function and to generate an event associated with the unique function that is associated with the SEAM. The system further includes a computer readable storage medium having a configuration file recorded thereon that comprises a dynamic data store (DDS) and a static data store (SDS). The DDS includes an event queue and one or more response queues. The SDS includes a persistent software object, the persistent software object configured to map a specific event from the event queue to a predefined response record and to assign a response queue into which the predefined response record is to be placed. The system further includes a workflow service module, the work flow service module being configured to coordinate data transfer between the SDS, the DDS and each of the plurality of SEAMs.

A method is provided for coordinating functions of a computing device to accomplish a task. The method includes storing a plurality of standardized executable application modules (SEAMs) within the computing device, each SEAM is configured to execute a unique function among the plurality of SEAMs and to generate an event associated with each SEAM's unique function. The method also includes installing a configuration file into the computing device comprising a dynamic data store (DDS) and a static data store (SDS). The DDS comprises an event queue and one or more response queues. The SDS comprises a state machine, the state machine is configured to map a specific event to a predefined response record and indicating a response queue into which the predefined response record is to be placed. The method further comprises storing a workflow service module, the work flow service module is configured to coordinate data transfer between the SDS, the DDS and each of the plurality of SEAMs.

A method is provided for coordinating functions of a computing device to accomplish a task. The method includes determining when an event queue that is stored on a memory device is empty and when the event queue is not empty then an event is read from the event queue. The method also includes requesting a response record from a memory location based on the event and storing the response record in a response queue. However, when the event queue is empty, then a response record is read from the response queue and a function call is made to a standardized executable application module identified in the response record.

BRIEF DESCRIPTION OF THE DRAWINGS

The present invention will hereinafter be described in conjunction with the following drawing figures, wherein like numerals denote like elements.

FIGS. 4-6 are exemplary screen shots illustrating a GUI for configuring a computing node within a hierarchical structure;

FIGS. 7-9 are exemplary screen shots illustrating a GUI for configuring an executable application module;

DETAILED DESCRIPTION

Figure 1:
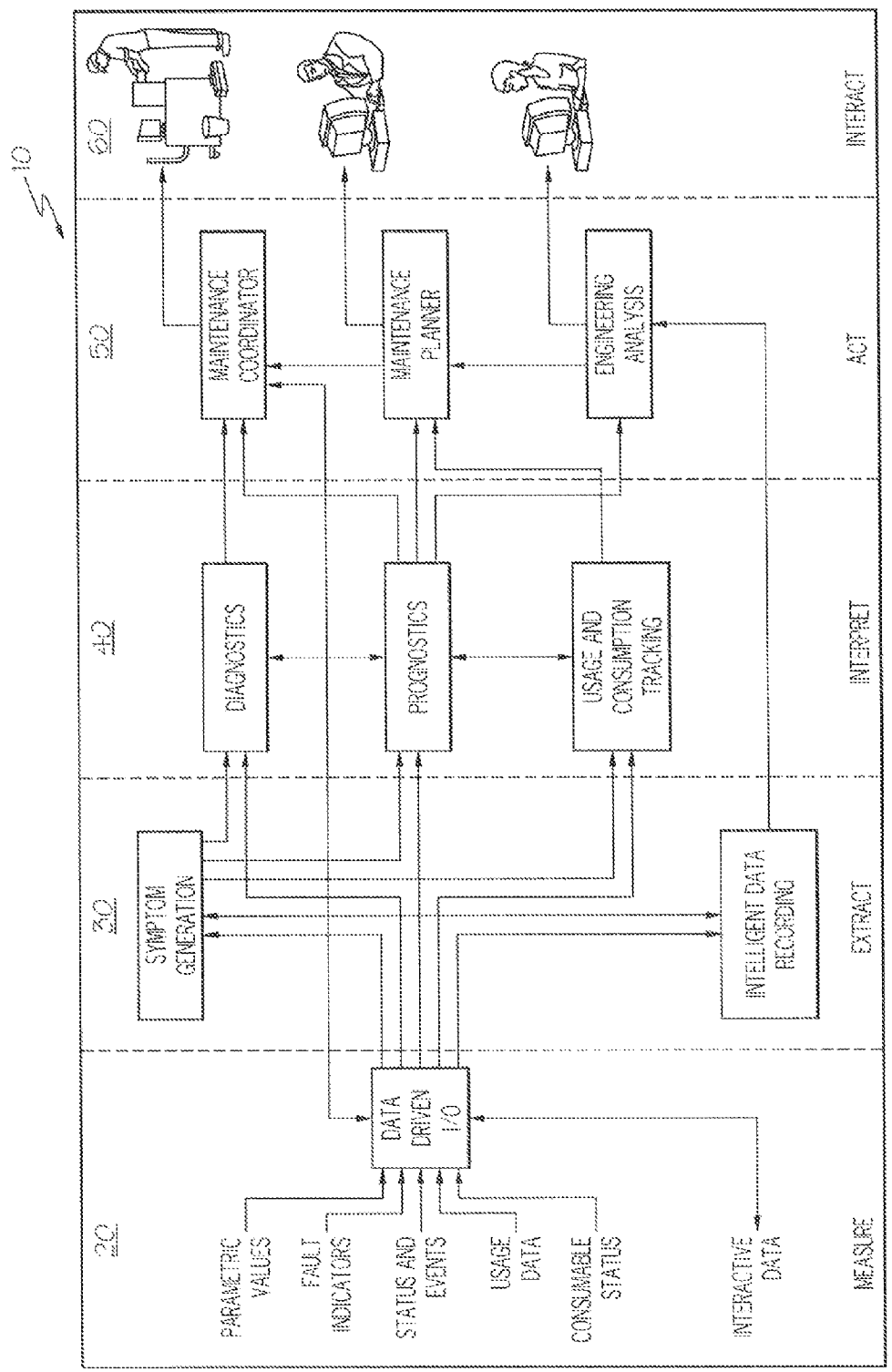
FIG. 1 is a simplified block diagram of a conventional multi-level health maintenance process.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described below in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a controller, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment will be presented in the following detailed description, it should be appreciated that a vast number of variations exist. It should also be appreciated that the exemplary embodiment or exemplary embodiments are only examples, and are not intended to limit the scope, applicability, or configuration of the invention in any way. Rather, the following detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

Figure 2:
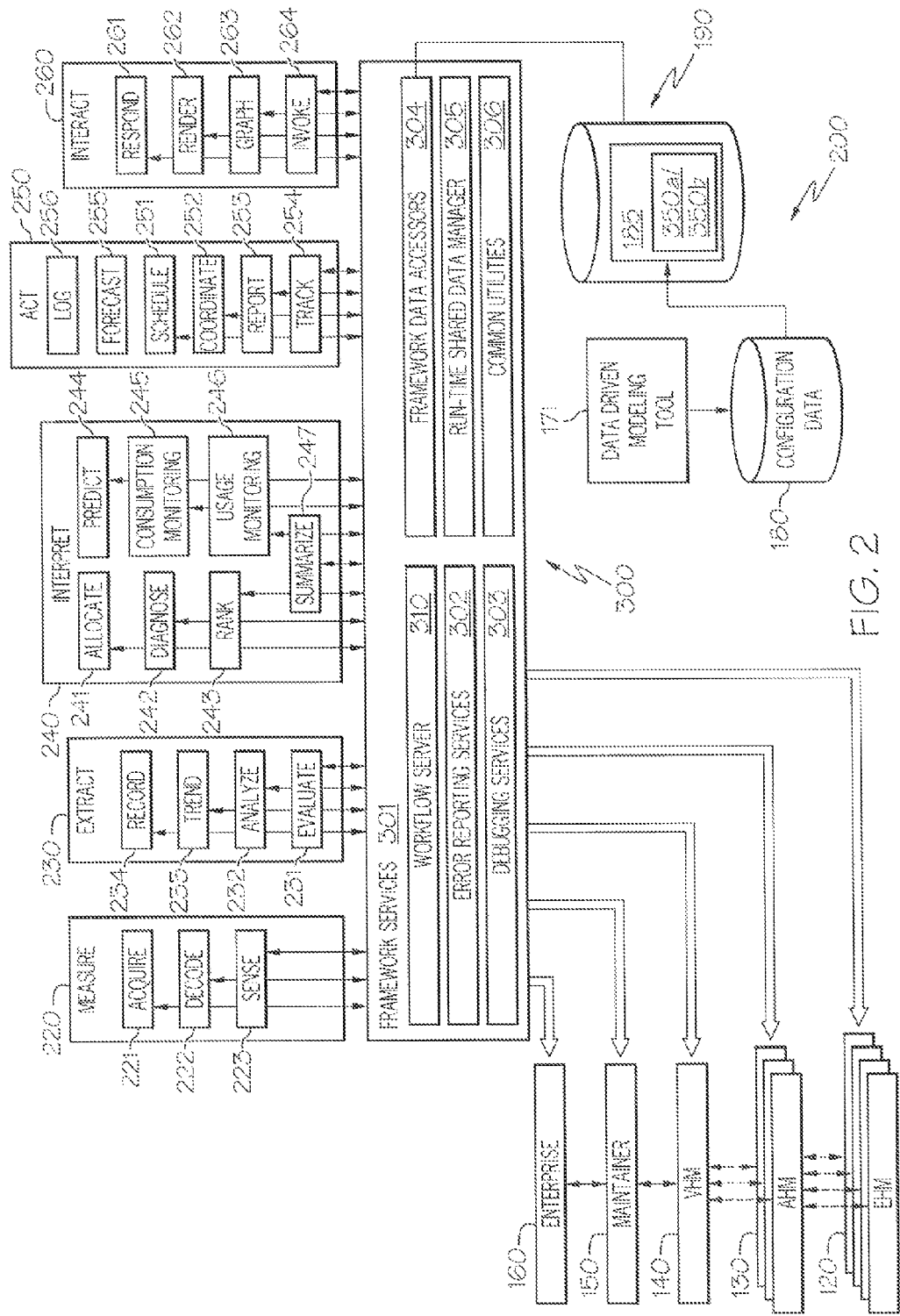
FIG. 2 is a simplified functional block diagram for embodiments of hierarchical structure.

FIG. 2 is a simplified functional block diagram for embodiments of a hierarchical structure 200 that may be timely reconfigured by the user. This may be accomplished by altering a set of configuration data 180 via a data driven modeling tool 171, which also may be described as a model based configuration means. The configuration data 180 may be stored in a static data store (e.g. a ROM), a dynamic data store (e.g. RAM), or both 190.

In light of the plethora of complex systems that may be monitored by the embodiments being described herein below and the wide range of functionality that may be desired at any point in the complex system, the following description contains non-limiting examples of the subject matter being disclosed herein. A specific non-limiting example of a complex system that may complement the following exemplary embodiments may be the vehicle as described in co-owned, co-pending application Ser. No. 12/493,750, which is assigned to the assignee of the instant application.

For the sake of brevity and simplicity, the present example will be assumed to have only five different processing levels or "application layers." An Application Layer (120'-160') is a set of functions or services programmed into run-time software resident in one or more computing nodes sharing a particular hierarchical level and which is adapted to meet the needs of a user concerning a particular health management implementation. As non-limiting examples, an application layer may be an Equipment Health Manager (EHM) Layer 120, an Area Health Manager (AHM) Layer 130, a Vehicle Heath Manager (VHM) Layer 140, a Maintainer Layer 150, or an Enterprise Layer 160.

However, in equivalent embodiments discussed herein, the hierarchical structure 200 may have any number of levels of application layers (120-160). Application layers (120-160) may include any number of computing nodes, which are computing devices. The number of nodes is determined by the complexity of the complex system and the sophistication of the monitoring desired by the user. In some embodiments, multiple nodes (120'-160') may be resident in one computing device. The computing nodes of the equipment based layers (EHM Layer 120, AHM Layer 130, VHM Layer 140, Maintainer layer 150 and Enterprise layer 160) may be also referred to as an EHM 120', an AHM 130', a VHM 140', a maintainer node 150' and an enterprise node 160'.

In the exemplary embodiments disclosed herein, an EHM 120' is a computing device that provides an integrated view of the status of a single component of the monitored assets comprising the lowest level of the hierarchical structure 200. The EHM 120' may have different nomenclature favored by others. For example, in equivalent embodiments the EHM 120' also be known as a Component Area Manager (CAM). A complex system may require a large number of EHMs (120'), each of which may include multiple times series generation sources such as sensors, transducers, Built-In-Test-Equipment (BITE) and the like. EHMs (120') are preferably located in electronic proximity to a time series data generation source in order to detect symptomatic times series patterns when they occur.

An AHM 130' is a computing device situated in the next higher hierarchical level of the hierarchical structure 200 and may receive and process message, command and data inputs received from a number of EHMs 120' and other nodes 130'-160'. An AHM 130' may report and receive commands and data from higher level or lower level components of the hierarchical structure 200. An AHM 130' processes data and provides an integrated view of the health of a single subsystem of the complex system being monitored. The AHM 130' may have different nomenclature favored by others. For example, in equivalent embodiments the AHM 130' also be known as a Sub-system Area Manager (SAM).

A VHM 140' is a computing device situated in the next higher hierarchical level for the hierarchical structure 200 and may receive and process message, command and data inputs received from a number of EHMs 120' and AHMs 130'. A VHM 140' may report and receive commands and data from higher level components of the hierarchical structure 200 as well. A VHM 140' processes data and provides an integrated view of the health of the entire complex system being monitored. The VHM 140' may have different nomenclature favored by others. For example, in equivalent embodiments the VHM 140' also be known as a system level control manager (SLCM).

A Maintainer Layer 150 contains one or more computing node (150') that analyze data received from the EHMs (120'), AHMs 130' and VHM(s) 140' and supports local field maintenance activities. Non-limiting examples of an Maintainer Level computing system is the Windows® PC ground based station (PC-GBS) software produced by Intelligent Automation Corporation a subsidiary of Honeywell International of Morristown, N.J.; or the US Army's Platform Soldier-Mission Readiness System (PS-MRS). The Maintainer Layer system may have different nomenclature favored by others. MNT nodes 150' also receive data, commands and messages from higher level nodes 160'.

An Enterprise Layer 160 contains one or more computing nodes (160') that analyze data received from the EHMs 120', AHMs 130', VHM(s) 140' and the Maintainer Layer 150. The Enterprise level supports the maintenance, logistics and operation of a multitude or fleet of assets. Non-limiting examples of an Enterprise Layer 160 computing system is the ZING™ system and the Predictive Trend Monitoring and Diagnostics System from Honeywell International. The Enterprise layer 160 may have different nomenclature favored by others.

In accordance with the precepts of the subject matter disclosed herein, each computing node (120'-160') of each level of the hierarchical structure 200 may be individually and timely configured or reconfigured by the user by way of the data driven modeling tool 171. The data driven modeling tool 171 allows a user to directly alter the configuration data 180, which in turn provides specific direction and data to, and/or initiates, one or more standardized executable application modules (SEAMs) (221-264) resident in each computing node (120'-160') of the hierarchical structure 200 via the model driven GUI 170. In the following description the term "configure" and "provide specific direction and data" may be used synonymously.

The number of SEAMs (221-264) is not limited and may be expanded beyond the number discussed herein. Similarly, the SEAMs (221-264) discussed herein may be combined into fewer modules or broken down into component modules as may be required without departing from the scope of the disclosure herein. The SEAMs (221-264) are a set of run-time software that are selectable from one or more re-use libraries (220-260) and are subsequently directed to meet the health management implementation needs of a user. Each SEAM (221-264) contains executable code comprising a set of logic steps defining standardized subroutines designed to carry out a basic function that may be directed and redirected at a later time to carry out a specific functionality.

There are 24 exemplary SEAMs (221-264) discussed herein that are selected from five non-limiting, exemplary libraries: a Measure Library 220, an Extract Library 230, an Interpret Library 240, an Act Library 250 and an Interact Library 260. The SEAMs (221-264) are basic un-modifiable modular software objects that are directed to complete specific tasks via the configuration data 180 after the SEAMs (221-264) are populated within the hierarchical structure 200. The configuration data 180 is implemented in conjunction with a SEAM (221-264) via the delivery to a node (120'-160') of a configuration file 185 containing the configuration data 180. Once configured, the SEAMs (221-264) within the node may then cooperatively perform a specific set of functions on data collected from the complex system. A non-limiting example of a specific set of functions may be a health monitoring algorithm.

As non-limiting examples, the Measure Library 220 may include an Acquire SEAM 221, a Sense SEAM 223, and a Decode SEAM 222. The Acquire SEAM 221 functionality may provide a primary path for the input of data into a computing node (120'-160') through a customized adapter 325 (See, FIG. 3) which embodies external callable interfaces. The customized adapter 325 pushes blocks of data into the Acquire SEAM 221, which then parses the data block and queues it for subsequent processing by another executable application (222-264).

The Sense SEAM 223 may provide a secondary path for the input of data into a computing node (120'-160') through a system initiated request to read data from a physical I/O device (i.e. Serial data ports, Sensor I/O interfaces, etc.). The Sense SEAM 223, then parses the data block, and queues it for subsequent processing by another executable application (222-264).

The Decode SEAM 222 may take the data queued by the Acquire SEAM 221 or Sense SEAM 223 and translate the data into a useable form (i.e. symptoms and/or variables) that other executable applications can process. The Decode SEAM 222 may also fill a circular buffer with the data blocks queued by an Acquire SEAM 221 to enable snapshot or data logging functions.

The Extract Library 230 may include an Evaluate SEAM 231, a Record SEAM 234, an Analyze SEAM 232, a Trend SEAM 233 and a record SEAM 234. The Evaluate SEAM 231 may perform a periodic assessment of state variables of the complex system to trigger data collection, set inhibit conditions and detect complex system events based on real-time or near real-time data.

The Record SEAM 234 may evaluate decoded symptoms and variables to determine when snapshot/data logger functions are to be executed. If a snapshot/data log function has been triggered, the Record SEAM 234 may create specific snapshot/data logs and send them to a dynamic data store (DDS) 350b. The DDS 350b is a data storage location in a configuration file 185. Snapshots may be triggered by another executable application (221-264) or by an external system (not shown).

The Analyze SEAM 232 may run one or more algorithms using the variable values and trend data that may have been assembled by the Trend SEAM 233 and subsequently stored in a dynamic data store (DDS) 350b to determine specific symptom states and/or provide estimates of unmeasured parameter values of interest.

The Interpret Library 240 may include an Allocate SEAM 241, a Diagnose SEAM 242, a Rank Seam 243, a Predict SEAM 244, A Consumption Monitoring SEAM 245, a Usage Monitoring SEAM 246, and a Summarize SEAM 247. The Allocate SEAM 241 may perform inhibit processing, cascade effect removal and time delay processing on a set of symptoms, and then allocate the symptoms to the appropriate fault condition(s) that is (are) specified for the monitored device or subsystem. The Allocate SEAM 241 may also update the state of each fault condition based on changes in the state of any particular symptom associated with a fault condition.

The Diagnose SEAM 242 may orchestrate interaction between a system user, monitored assets and diagnostic reasoning to reduce the number of ambiguous failure modes for a given active fault condition until a maintenance procedure is identified that will resolve the root cause of the fault condition.

The Rank SEAM 243 may rank order potential failure modes after diagnostic reasoning has been completed. The failure modes, related corrective actions (CA) and relevant test procedures associated with a particular active fault condition are ranked according to pre-defined criteria stored in a Static Data Store (SDS) 350a. A SDS is a static data storage location in a configuration file 185 containing a persistent software object that relates an event to a pre-defined response.

The Predict SEAM 244 may run prognostic algorithms on trending data stored in the DDS 350b in order to determine potential future failures that may occur and provide a predictive time estimate.

The Consumption Monitoring SEAM 245 may monitor consumption indicators and/or may run prognostic algorithms on trending data stored in the DDS 350b that are configured to track the consumption of perishable/life-limited supply material in the complex system and then predict when resupply will be needed. The consumption monitoring functionality may be invoked by a workflow service module 310, which is a component functionality of an internal callable interface 300 and will be discussed further below.

The Usage Monitoring SEAM 246 may monitor trend data stored in the DDS 350b to track the usage of a monitored device or subsystem in order to estimate the need for preventative maintenance and other maintenance operations. The usage monitoring functionality may be invoked by the workflow service module 310, which is a component 261 functionality of the internal callable interface 300.

The Summarize SEAM 247 may fuse health data received from all subsystems monitored by an application layer and its subordinate layers (120-160) into a hierarchical set of asset status reports. Such reports may indicate physical or functional availability for use. The asset status reports may be displayed in a series of graphics or data trees on the GUI 170 that summarizes the hierarchical nature of the data in a manner that allows the user to drill down into the CBM layer by layer for more detail. The Summarize functionality may be invoked by the Workflow service module 310. This invocation may be triggered in response to an event that indicates that a diagnostic conclusion has been updated by another module of the plurality. The display of the asset status may be invoked by the user through the user interface.

The Act Library 250 may include a Schedule SEAM 251, a Coordinate SEAM 252, a Report SEAM 253, a Track SEAM 254, a Forecast SEAM 255 and a Log SEAM 256. The Schedule SEAM 251 schedules the optimal time in which required or recommended maintenance actions (MA) should be performed in accordance with predefined criteria. Data used to evaluate the timing include specified priorities and the availability of required assets such as maintenance personnel, parts, tools, specialized maintenance equipment and the device/subsystem itself. Schedule functionality may be invoked by the workflow service module 310.

The Coordinate SEAM 252 coordinates the execution of actions and the reporting of the results of those actions between application layers 120-160 and between layers and their monitored devices/subsystems. Exemplary, non-limiting actions include initiating a BIT or a snapshot function. Actions may be pushed into and results may be pulled out of the Coordinate SEAM 252 using a customized adapter 325a-e which embodies an external callable interface. The customized adapter 325a-e may be symmetric such that the same communications protocol may be used when communicating up the hierarchy as when communicating down the hierarchy.

The Report SEAM 253 may generate a specified data block to be sent to the next higher application in the hierarchy and/or to an external user. Report data may be pulled from the Report SEAM 253 by the customized adapter 325a-e. The Report SEAM 253 may generate data that includes a health status summary of the monitored asset.

The Track SEAM 254 may interact with the user to display actions for which the user is assigned and to allow work to be accomplished or reassigned.

The Forecast SEAM 255 may determine the need for materials, labor, facilities and other resources in order to support the optimization of logistic services. Forecast functionality may be invoked by the Workflow service module 310.

The Log SEAM 256 may maintain journals of selected data items and how the data items had been determined over a selected time period. Logging may be performed for any desired data item. Non-limiting examples include maintenance actions, reported faults, events and the like.

The Interact Library 260 may include a Render SEAM 262, a Respond SEAM 261, a Graph SEAM 263, and an Invoke SEAM 264. The Render SEAM 262 may construct reports, tabularized data, structured data and HTML pages for display, export or delivery to the user.

The Respond SEAM 261 may render data for display to the user describing the overall health of the complex system and to support detailed views to allow "drill down" for display of summary evidence, recommended actions and dialogs. The rendering of display data may be initiated by the Workflow service module 310; but the data may be pulled from the Render SEAM 262 via the callable interface 300. The Respond SEAM 261 may also receive and process commands from the user then route the commands to the appropriate module in the appropriate node for execution and processing. The commands may be pushed into the Respond Module via the callable interface 300.

The Graph SEAM 263 may provide graphical data for use by the Render SEAM 262 in the user displays on GUI 170. The graphical data may include the static content of snapshot and trend files or may dynamically update the content of the data in the circular buffer.

The Invoke SEAM 264 may retrieve documents to be displayed to a maintainer or interacts with an external document server system (not shown) to cause externally managed documents to be imported and displayed.

To reiterate, each of the SEAMs (221-264) discussed above are never modified. The SEAMs (221-264) are loaded into any computing node (120'-160') of the hierarchical structure 200 and any number of SEAMs may be loaded into a single node. Once installed, each standard executable application module (221-264) may be initialized, directed and redirected by a user by changing the configuration data 180 resident in the database 190 to perform specific tasks in regard to its host computing device or platform.

Communication between SEAMs (221-264) within a node is facilitated by a callable interface 300. A callable interface 300 is resident in each computing node (120'-160') of the hierarchical structure 200. The callable interface 300 may have several sub-modules (302-310) that may be co-resident in a single computing device of a computing node (120'-160'). Exemplary sub-modules of the callable interface 300 may include a framework executive 301 as a component of the callable interface 300, a workflow service module 310, an error reporting server 302, a debugging server 303, a framework data accessor, a run-time shared data manager 305 and common utilities 306. Those of ordinary skill in the art will recognize that in equivalent embodiments a "module," "a sub-module," "a server," or "a service" may comprise software, hardware, firmware or a combination thereof.

The framework executive 301 of a computing node provides functions that integrate the nodes within the hierarchical structure 200. The framework executive 301 in conjunction with the configuration files 185 coordinate initialization of each node including the SEAMs (221-264) and the other service modules 301-310 allowing the execution of functions that are not triggered by a customized adapter 325 (discussed further below). In some embodiments, the computing nodes in all application layers may have a framework executive 301. In other embodiments, nodes in most application layers except, for example, an EHM Layer 120 will have a framework executive 301. In such embodiments, the computing nodes 120' in the EHM layer 120 may rely on its host platform (i.e. computing device) operating software to perform the functions of the framework executive.

Error reporting services 302 provide functions for reporting run-time errors in a node (120-160) within the hierarchical structure 200. The error reporting server 302 converts application errors into symptoms that are then processed as any other failure symptom, reports application errors to a debugging server 303 and reports application errors to a persistent data manager (not shown).

Debugging services 303 collects and reports debugging status of an executable application module (221-264) during testing, integration, certification, or advanced maintenance services. This server may allow the user to set values for variables in the DDS 350b and to assert workflow events.

The framework data accessor 304 provides read access to the SDS 350a and read/write access to the DDS 350b (each stored in a memory 190) by the SEAMs (221-264) in a computing node (120'-160'). Write access to the SDS 350a is accomplished via the data modeling tool 171, which includes GUI 170.

The run-time shared data manager 305 manages all node in-memory run-time perishable data structures that are shared between SEAMs (221-264) that are not stored in the DDS 350b, but does not include cached static data. As non-limiting examples of perishable data structures may include I/O queues and circular buffers.

Common utilities 306 may include common message encoding/decoding, time-stamping and expression evaluation functions for use by the SEAMs (221-264) installed in a computing node.

The work flow service module 310 is a standard set of logic instructions that enable a data-driven flow of tasks within a computing node to be executed by the various SEAMs (221-264) within the node. The workflow service module 310 acts as a communication control point within the computing node where all communications related to program execution to or from one executable application module (221-264) are directed through the node's workflow service module 310. Stated differently, the workflow service module 310 of a node (120'-160') orchestrates the work flow sequence among the various SEAMs (221-264) that happen to reside in the node. In some embodiments the workflow service module 310 may be a state machine.

Figure 3:
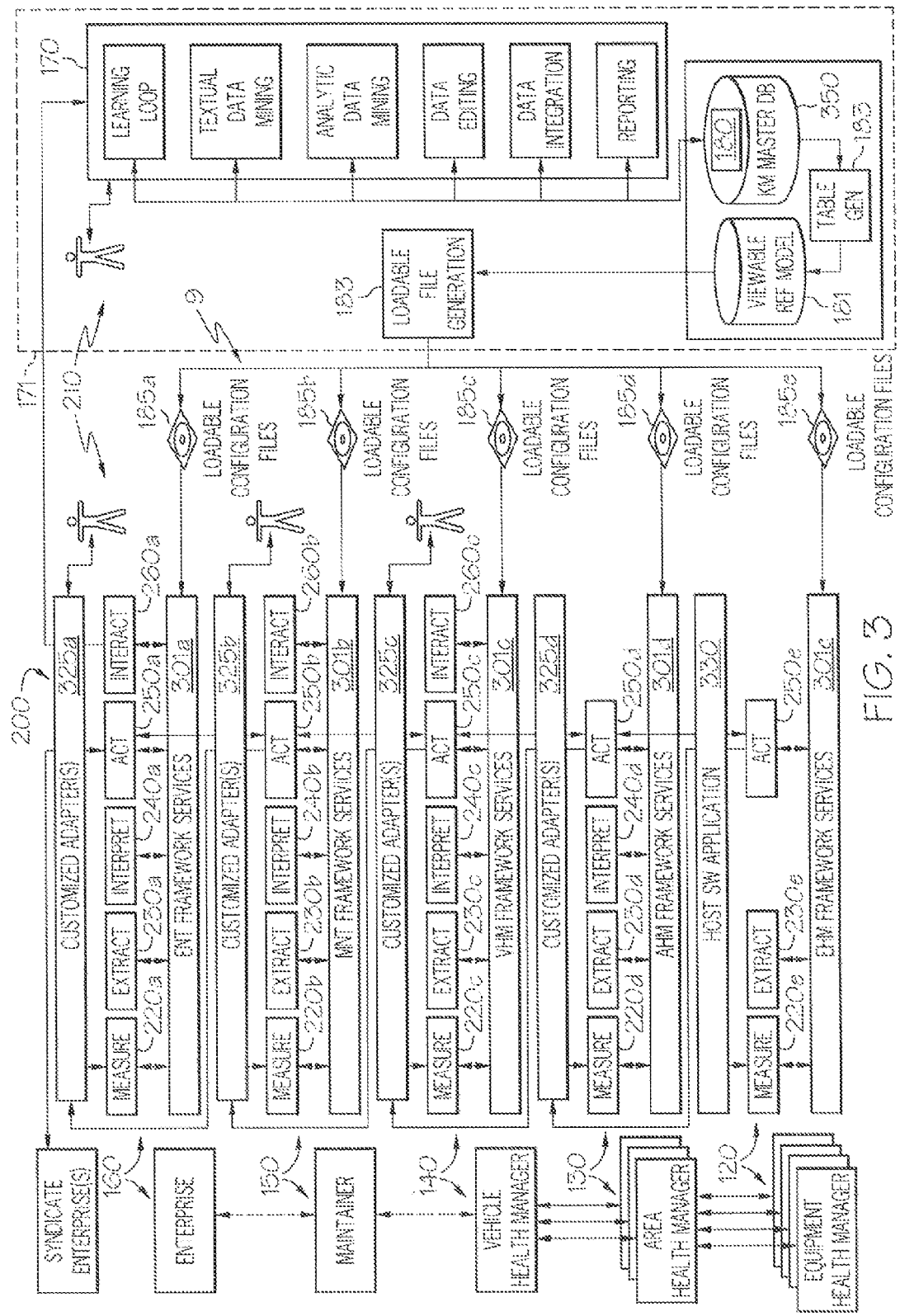
FIG. 3 is a simplified schematic of an exemplary reconfigurable system to optimize run time performance of a hierarchical condition based maintenance system.

FIG. 3 is a simplified, exemplary schematic of a configured hierarchical structure 200 that may optimize the run time performance of the hierarchical structure 200. The exemplary embodiment of FIG. 3 features a hierarchical structure 200 comprising five exemplary hierarchical layers (120-160), although in other embodiments the number of hierarchical layers may range from a single layer to any number of layers. Each hierarchical layer (120-160) includes one or more nodes (120'-160') containing SEAMs (221-264) that were copied and loaded from one of the reusable libraries (220-260) into a computing node (120'-160') in the layer. Each SEAM (221-264) may be configured by a user 210 by modifying its respective loadable configuration file 185. The loadable configuration file 185 is constructed using the data driven modeling tool 171.

For the sake of simplicity, the SEAMs (221-264) may be discussed below in terms of their respective libraries. The number of combinations and permutations of executable applications (221-264) is large and renders a discussion using specific SEAMs unnecessarily cumbersome.

At an EHM layer 120, there may be a number of EHM nodes 120', each being operated by a particular host computing device that is coupled to one or more sensors and/or actuators (not shown) of a particular component of the complex system. As a non-limiting example, the component of the complex system may be a roller bearing that is monitored by a temperature sensor, a vibration sensor, a built-in-test, sensor and a tachometer, each sensor being communicatively coupled to the computing device (i.e. a node). As a non-limiting example, the host computing device of an EHM 120' of the complex system may be a computer driven component area manager ("CAM")(i.e. a node). For a non-limiting example of a CAM that may be suitable for use as EHM nodes, see co-owned, co-pending U.S. patent application Ser. No. 12/493,750.

Each EHM (120') host computing device in this example is operated by a host software application 330. The host executive software 330 may be a proprietary program, a custom designed program or an off-the-shelf program. In addition to operating the host device, the host software application also may support any and all of the SEAMs (221-264) via the framework services 301 by acting as a communication interface means between EHMs 120' and between EHMs 120' and other nodes located in the higher levels.

The exemplary embodiment of FIG. 3 illustrates that the host executive software 330 of an EHM 120' may host (i.e. cooperate) one or more SEAMs 220e from the Measure Library 220, one or more SEAMs 230e from the Extract Library 230 and one or more SEAMs 250e from the Act Library 250. The SEAMs 220e, 230e, and 250e are identical to their counterpart application modules that may reside in any another node in any other level in the hierarchical structure 200. Only when directed by the configuration file 185e, will a SEAM(s) (221-264) differ in performance from its counterpart module that has been configured for and is a resident in another node in the hierarchical structure 200. Once configured/directed, a standardized executable application (221-264) becomes a special purpose executable application module.

At an AHM level 130, there may be a number of AHM nodes 130'. Each AHM node is associated with a particular host computing device that may be coupled to one or more sensors and/or actuators of a particular component(s) or a subsystem of the complex system and are in operable communication with other AHM nodes 130', with various EHM nodes 120' and with higher level nodes (e.g., see 501, 502, 601 and 602 in FIGS. 5-6). As a non-limiting example, the host computing device of an AHM of the complex system may be a computer driven sub-system area manager ("SAM") (i.e. a node) operating under its own operating system (not shown). For non-limiting examples of a SAM that may be suitable for use as an AHM node, see co-owned, co-pending patent application Ser. No. 12/493,750.

The exemplary AHM node 130' of FIG. 3 illustrates that the AHM 130' has an additional interpret functionality 240d that in this example has not been configured into the EHM 120'. This is not to say that the EHM 120' cannot accept or execute a function from the Interpret library 240, but that the system user 210 has chosen not to populate the EHM node 120' with that general functionality. On the other hand, the AHM node 130' software hosts one or more SEAMs 220d from the Measure Library 220, one or more SEAMs 230d from the Extract Library 230 and one or more SEAMs 250d from the Act Library 250. In their unconfigured or undirected state, the SEAMs 220d, 230d, and 250d are identical to their counterpart application modules that may reside in any another node in any other level in the hierarchical structure 200.

Unlike the exemplary EHM node 120', the exemplary AHM node 130' may include a different communication interface means such as the customized adapter 325d. A customized adapter 325 is a set of services, run-time software, hardware and software tools that are not associated with any of the SEAMs (221-264). The customized adapters 325 are configured to bridge any communication or implementation gap between the hierarchical CBM system software and the computing device operating software, such as the host application software (not shown). Each computing node (120'-160') may be operated by its own operating system, which is its host application software. For the sake of clarity, FIG. 3 shows only the host executive software 330 for the EHM 120'. However, host application software exists in all computing nodes (120'-160').

In particular the customized adapters 325 provide symmetric communication interfaces (e.g., communication protocols) between computing nodes and between computing nodes of different levels. The customized adapter 325 *a-d* allow for the use of a common communication protocol throughout the hierarchical structure 200 from the lowest EHM layer 120 to the highest enterprise layer 160 as well as with the memory 190.

At a VHM layer 140, there may be a number of VHM nodes 140', each VHM node is associated with a particular host computing device that may be in operative communication with one or more sensors and/or actuators of a particular component(s) of the complex system via an EHM 120' or to subsystems of the complex system and that are in operable communication via their respective AHMs 130'. As a non-limiting example, the VHM 140' may be a computer driven system level control manager ("SLCM")(i.e. also a node). For non-limiting examples of a SLCM that may be suitable for use as a VHM node, see co-owned, co-pending patent application Ser. No. 12/493,750.

In the exemplary hierarchical structure 200 there may be only one VHM 140', which may be associated with any number of AHM 130' and EHM 120' nodes monitoring a subsystems of the complex system. In other embodiments, there may more than one VHM 140' resident within the complex system. As a non-limiting example, the complex system may be a fleet of trucks with one VHM 140' in each truck that communicates with several EHMs 120' and with several AHMs 130' in each truck. Each group of EHMs 120' and AHMs 130' in a truck may also be disposed in a hierarchical structure 200

FIG. 3 further illustrates that the exemplary VHM 140' has an additional Interact functionality 260c that has not been loaded into the EHM 120' or into the AHM 130'. This is not to say that these lower level nodes cannot accept or execute an Interact function 260, but that the system user 210 has chosen not to populate the lower level nodes with that functionality. On the other hand, for example, the host software of VHM 140' hosts one or more SEAMs 220c from the Measure Library 220, one or more SEAMs 230c from the Extract Library 230, one or more SEAMs 240c from the Interpret Library 240 and one or more SEAMs 250c from the Act Library 250. The executable applications from the Interact library allow the system user 210 to access the VHM 140' directly and to view the direction thereof via the GUI 170. In their undirected state, the SEAMs 220c, 230c, 240c and 250c are identical to their counterpart application modules that may reside in any another node in any other level in the hierarchical structure 200. The standardized executable applications 220c-260c are directed to carry out specific functions via configuration files 185c.

Like the exemplary AHM node 130', an exemplary VHM node 140' includes a customized adapter 325c. The customized adapter 325c is also configured to bridge any communication or implementation gap between the hierarchical system software and the computing device operating software operating within VHM 140'.

At the Maintainer (MNT) layer 150, there may be a number of MNT nodes 150', each MNT node is associated with a particular host computing device that may be in operative communication with one or more sensors and/or actuators of a particular component(s) of the complex system via an EHM 120', to subsystems of the complex system and that are in operable communication via their respective AHM 130', and to the VHMs 140'. As a non-limiting example, the MNT node 150' may be a laptop computer in wired or wireless communication with the communication system 9 of the hierarchical structure 200.

FIG. 3 illustrates that the exemplary MNT node 150' may have the functionality of some or all of the executable applications (221-264). This is not to say that these lower level nodes cannot accept or execute any of the executable applications (221-264), but that the system user 210 has chosen not to populate the lower level nodes with that functionality. Like the exemplary VHM 140' the executable application(s) 260b from the Interact library allow the system user 210 to access the Maintainer node 150' directly and may view the direction thereof via the GUI 170. In their undirected state, the SEAMs 220b, 230b, 240b and 250b are identical to their standard counterpart application modules that may reside in any another node in any other level in the hierarchical structure 200. The executable applications 220b-260b are directed to carry out specific functions via configuration files 185b.

Like the exemplary AHM node 130' and VHM node 140', the MNT node 150' includes a customized adapter 325b. The customized adapter is also configured to bridge any communication implementation gap between the hierarchical system software and the computing device operating software operating within the various nodes of the hierarchical structure 200.

At the Enterprise (ENT) layer 160, there may be a number of ENT nodes 160', each ENT node is associated with a particular host computing device that may be in operative communication with one or more sensors and/or actuators of a particular component(s) of the complex system via an EHM 120', to subsystems of the complex system and that are in operable communication via their respective AHM modules 130' and the VHMs 140', as well the MNT nodes 150'. As a non-limiting example, the ENT node 160' may be a general purpose computer that is in wired or wireless communication with the communication system 9 of the hierarchical structure 200.

FIG. 3 also illustrates that the ENT node 160' may have the functionality of some or all of the executable applications (221-264) as selected and configured by the user. Like the exemplary VHM node 140', the executable application(s) 260a from the Interact library allow the system user 210 to access the ENT node 160' node directly via the GUI 170. In their undirected state, the SEAMs 220a, 230a, 240a and 250a are identical to their undirected counterpart application modules (221-264) that may reside in any another node in any other level in the hierarchical structure 200. The executable applications 220a-260a are configured/directed to carry out specific functions via configuration files 185a.

Like the exemplary AHM node 130', VHM node 140' and the MNT node 150', the ENT node 160' includes a customized adapter 325a. The customized adapter 325a is also configured to bridge any communication or implementation gap between the hierarchical system software and the host computing device software operating within the ENT node.

In various embodiments, none of the computing nodes (120'-160') are able to communicate directly with one another. Hence, all computing nodes (120'-160') communicate via the customized adapters (325). In other embodiments, most computing nodes 120'-160' may communicate via the customized adapters (325). For example, an exception may be an EHM 120', which may communicate via its host executive software 330.

A customized adapter 325 is a component of the host executive software 330 and is controlled by that host software. The customized adapter 325 provides an interface between the host executive software 330 and the SEAMs (221-264). The workflow service module 310 will invoke one or more of the SEAMs (221-264) and services (302, 303, 306) to make data available to the customized adapter 325, which places data from a node onto a data bus of the communication system 9 and pulls data from the bus for use by one of the SEAMs (221-264). For example, the Acquire SEAM 221 may receive data from the customized adapter 325, or the Report SEAM 253 may produce data to be placed on the bus by the customized adapter.

The communication system 9 may be any suitable wired or wireless communications means known in the art or that may be developed in the future. Exemplary, non-limiting communications means includes a CANbus, an Ethernet bus, a firewire bus, spacewire bus, an intranet, the Internet, a cellular telephone network, a packet switched telephone network, and the like.

The use of a universal input/output front end interface (not shown) may be included in each computing node (120'-160') as a customized adapter 325 or in addition to a customized adapter 325. The use of a universal input/output (I/O) front end interface makes each node behind the interface agnostic to the communications system by which it is communicating. Examples of universal I/O interfaces may be found in co-owned application Ser. Nos. 12/750,341 and 12/768,448, and are examples of communication interface means.

The various computing nodes (120'-160') of the hierarchical structure 200 may be populated using a number of methods known in the art, the discussion of which is outside the scope of this disclosure. However, exemplary methods include transferring and installing the pre-identified, pre-selected standardized executable applications to one or more data loaders of the complex system via a disk or other memory device such as a flash drive. Other methods include downloading and installing the executable applications directly from a remote computer over a wired or wireless network using the complex system model 181, the table generator 183 and the GUI 170.

The data modeling tool 171, table generator 183 and the GUI 170 may be driven by, or be a subsystem of any suitable HMS computer system known in the art. A non-limiting example of such an HMS system is the Knowledge Maintenance System used by Honeywell International of Morristown N.J. and is a non-limiting example of a model based configuration means. The data modeling tool 171 allows a subject matter expert to model their hierarchical structure 200 as to inputs, outputs, interfaces, errors, etc. The table generator 283 then condenses the system model information into a compact dataset that at runtime configures or directs the functionality of the various SEAMs (221-264) of hierarchical structure 200.

The GUI 170 renders a number of control screens to a user. The control screens are generated by the HMS system and provide an interface for the system user 210 to configure each SEAM (221-264) to perform specific monitoring, interpretation and reporting functions associated with the complex system (see. e.g., FIGS. 4-9).

FIGS. 4-7 illustrate a group of related exemplary screen shots from an exemplary KMS model based configuration means that may be rendered to a user via GUI 170 that may then be used to configure a computing node (120'-160') in hierarchical structure 200. For example, the EHM 120' is configured by editing one or more configuration files 185, comprising an SDS portion 350a a DDS portion 350b, from fault model content stored in the KM master database. In FIGS. 4-7, the EHM 120' monitoring the pressure of a pump is being further configured to filter noise from the high pressure supply to the pump.

Figure 4:
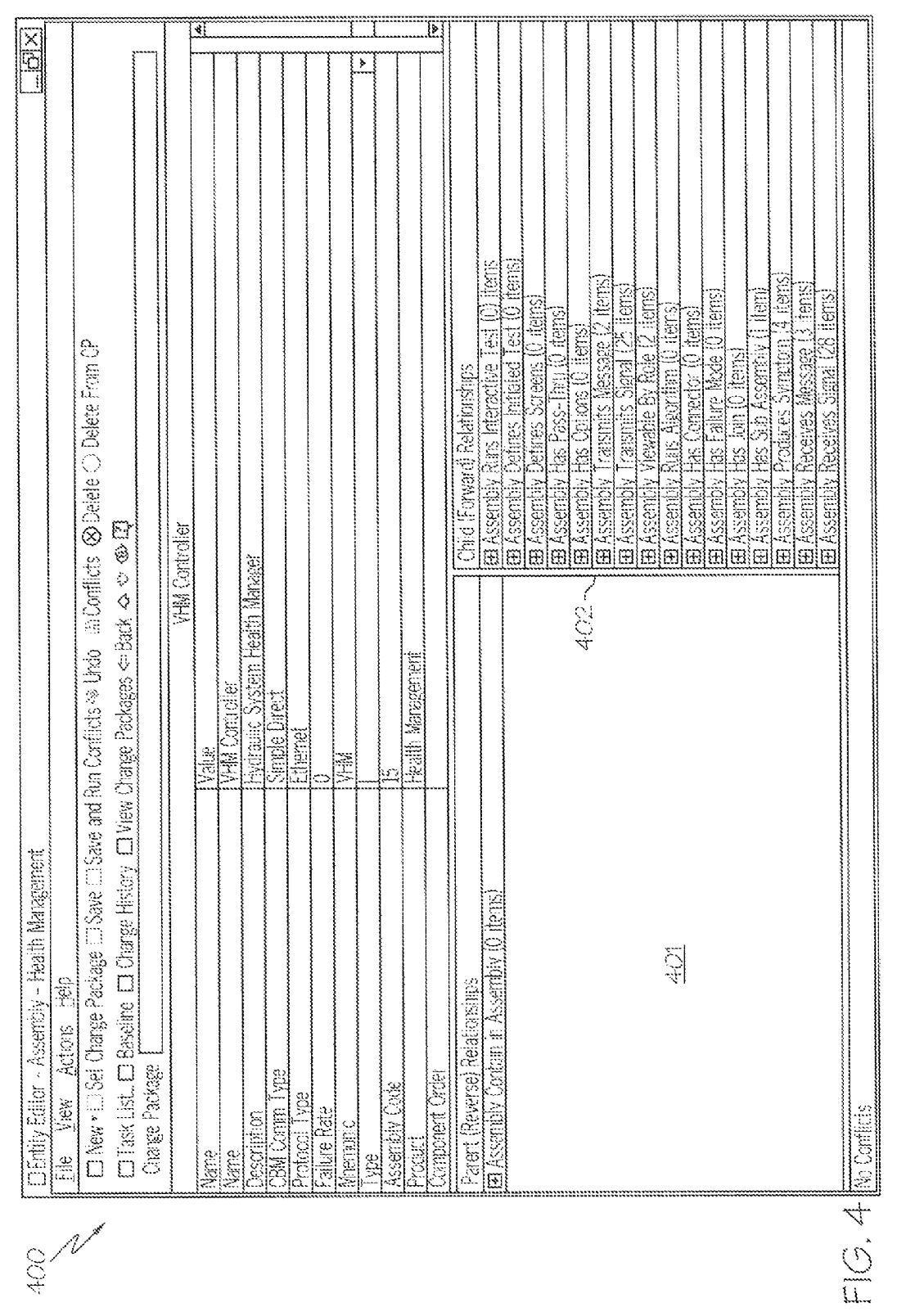

FIG. 4 is an exemplary GUI screen shot 400 that may be used to create configuration files 185 for a hydraulic system VHM 140'. The GUI of FIG. 4 allows the user 210 to define the parental relationships 401 and child relationships 402 to other computing nodes within the hierarchical structure 200. The information defined here may be then stored in the appropriate locations in the KMS database in memory 190.

FIG. 5 is an exemplary GUI screen shot 500 of an information viewer that allows a user 210 to view the specific relationships 501 between the VHM 140' of FIG. 4 and lower level EHMs 120' that indirectly or directly provide complex system symptom information 502 (i.e. operating data) from a variety of sensors. VHM 140' may be configured to receive a reported symptom from any source within the hierarchical structure 200.

FIG. 6 is a continuation page 600 of the exemplary GUI screen shoot 500 for the VHM 140' of FIG. 4. Continuation page 600 defines what messages 601 are sent from the VHM 140' to other computing nodes (120-160) in the hierarchical structure 200 and it defines what messages 602 are received by the VHM 140' from elsewhere in the hierarchical structure. For example, the VHM 140' sends a periodic status report to the Maintainer level 150. The VHM 140' also receives a status report from an AHM 130'.

Figure 7:
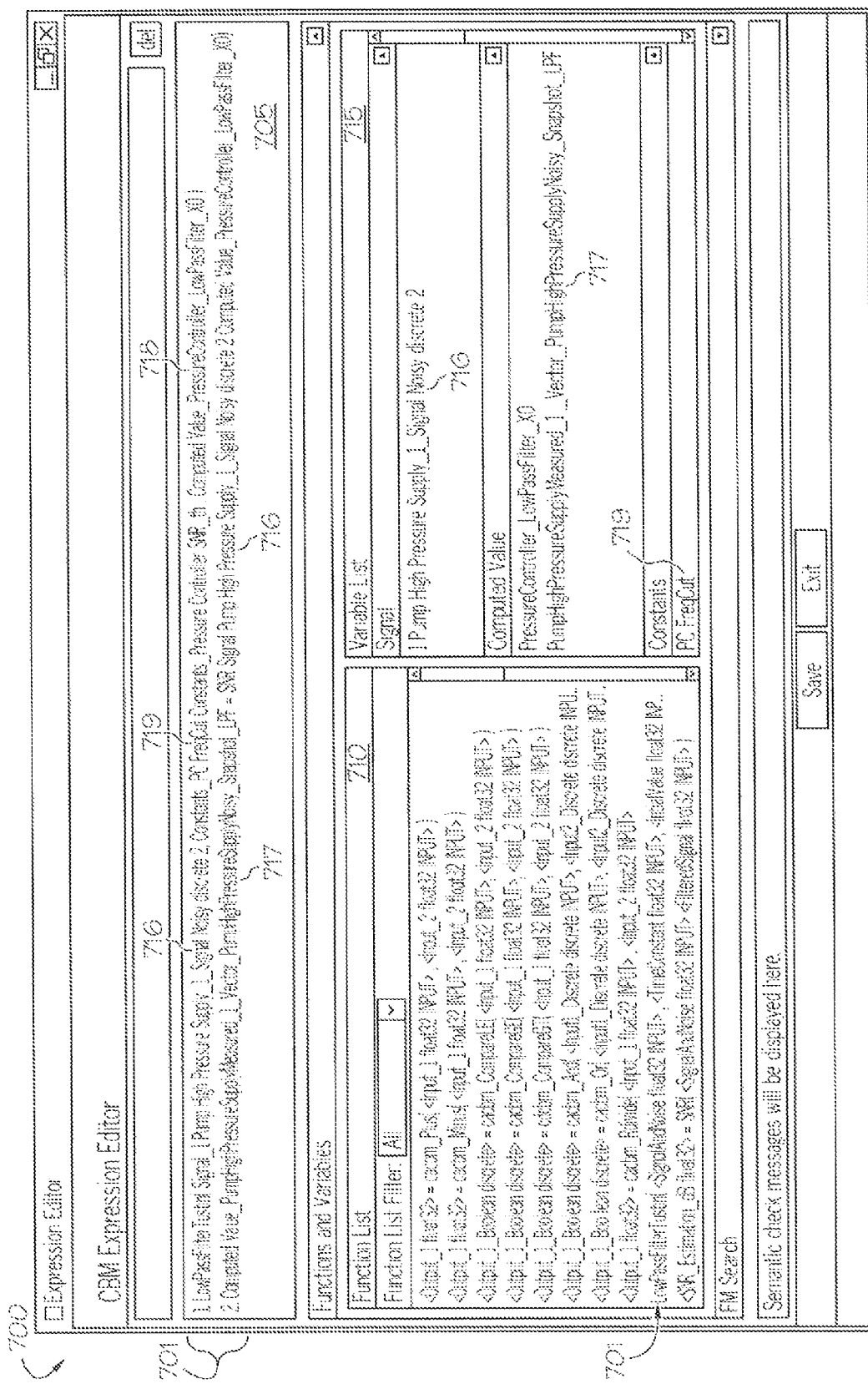

FIG. 7 is a first exemplary GUI screen shot 400 for configuring the functionality for an EHM 120' monitoring controller No. 3222 for a pump. Window 705 allows for a function definition 701 including the steps of the expression 702. The function definition 701 may be selected from a drop down function list 710. The variables (716, 718 and 719) to be input to the function 701 may also be selected from a drop down variable list 715 that includes the input variable 716, computed output variables (717, 718) and function constants 719.

In the exemplary screen shot of FIG. 7 the LowpassFilter-Tustin function has been selected from drop down menu 710. The exemplary function uses input signals "Signal_1 Pump High Pressure Supply_1_Signal Noisy Discrete 2" 716, constants "PC FreqCut" and "Pressure Controller SNR_th," and produces values for variables "Value_PressureController_LowPassFilter_X0" 718 and PumpHigh-PressureMeasured_1_Vector_PumpHigh-PressureSupplyNoisy_Snapshot_LPF 417."

Figure 8:
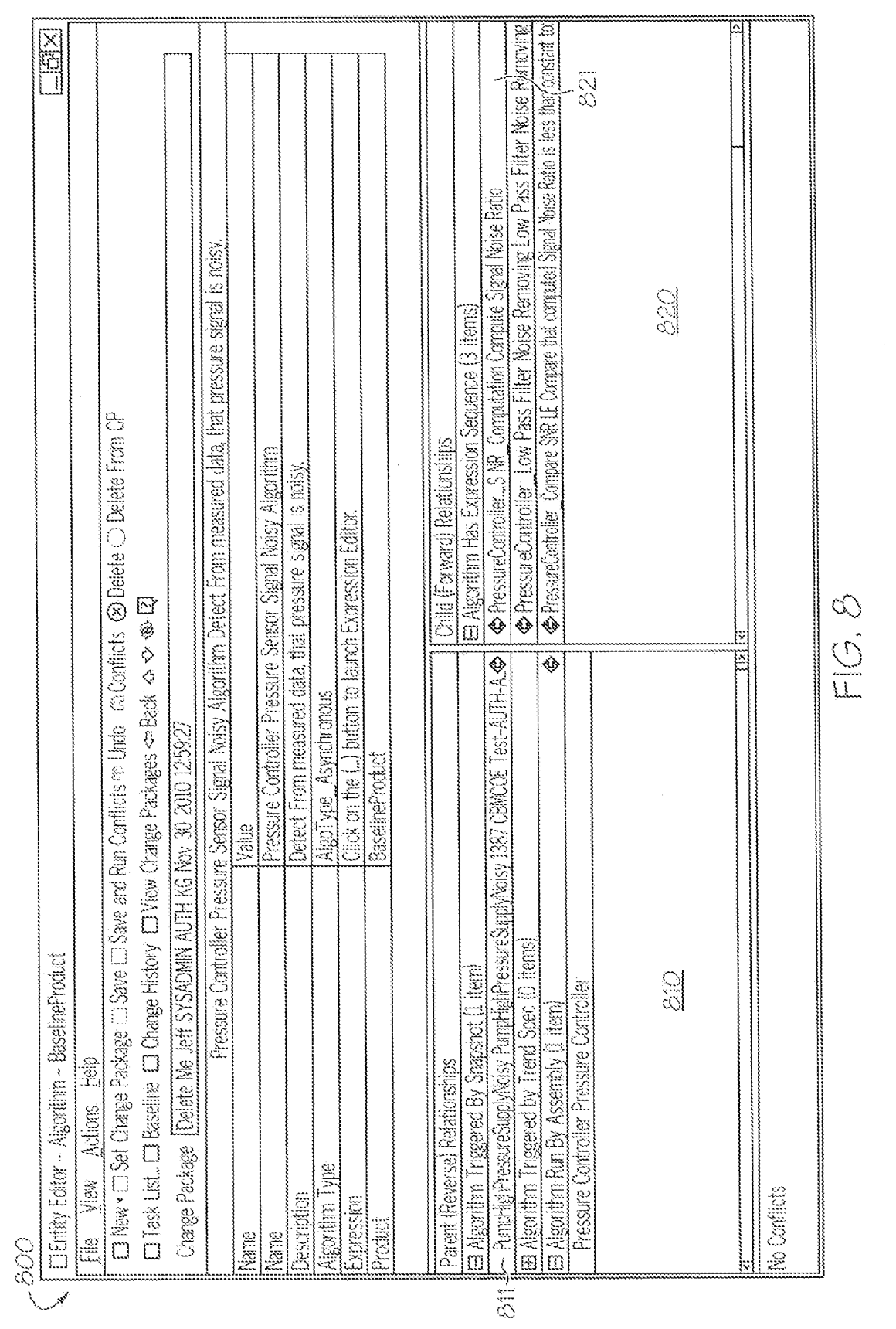
Figure 9:
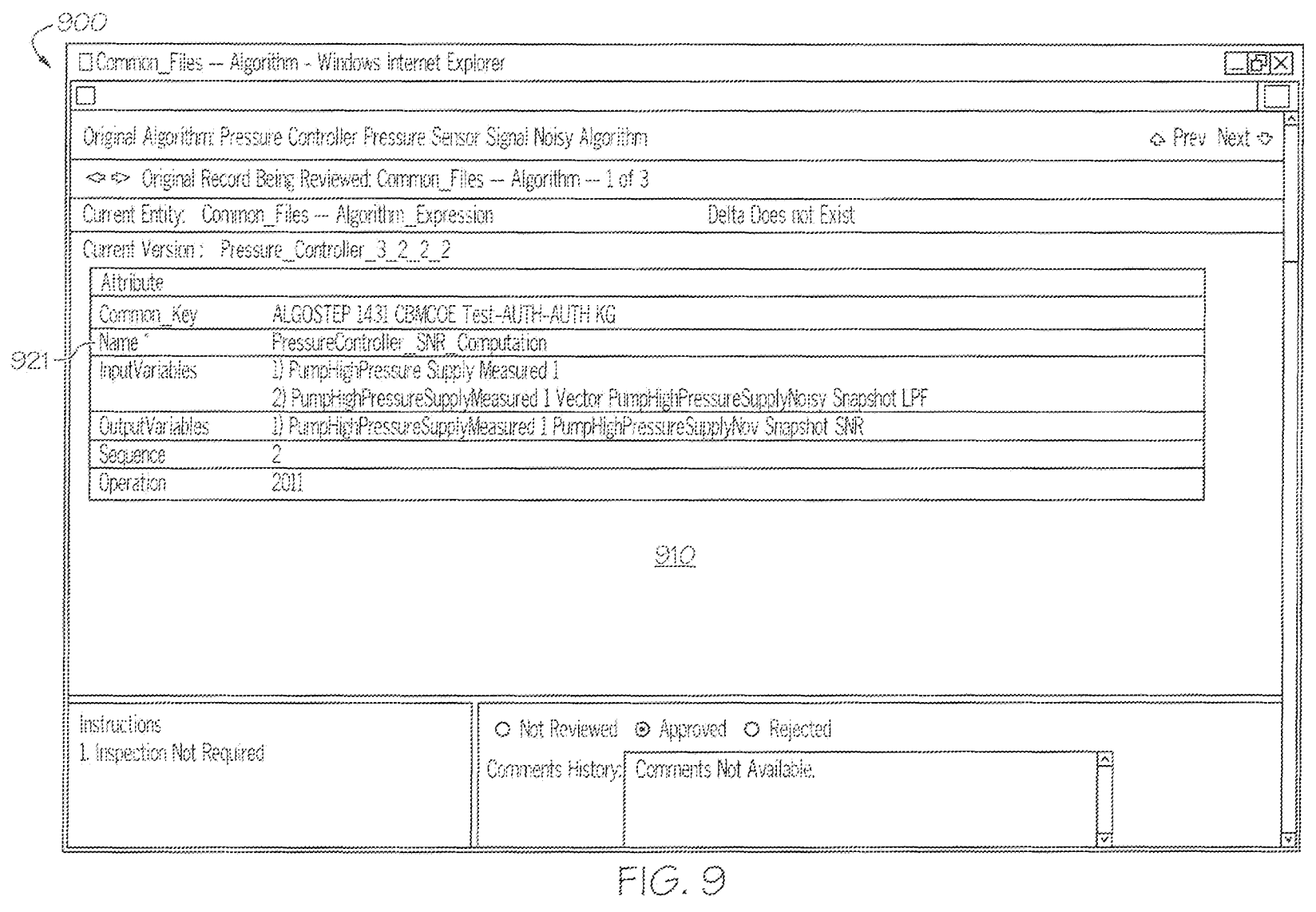

FIGS. 8-9 are exemplary screenshots that may be rendered by GUI 170 that provide the system user 210 with viewable configuration records residing in the KMS database in memory 190. More specifically, the views in FIGS. 8-9 present exemplary records of the "Pressure Sensor Signal Noisy" algorithm of a pressure controller.

FIG. 8 is an exemplary GUI 800 that includes a window 810 illustrating parent relationship to the algorithm "Pressure Controller Pressure Sensor Signal Noisy." In this example, the algorithm is triggered by a data snapshot "PumpHigh-PressureNoisyPumpHigh-PressureSupplyNoisy" 811 in the Pressure Controller. As can be seen by inspection of widow 810, the algorithm may also be configured to be triggered by a data trend. Window 820 illustrates the subsequent or child algorithms of "PumpHigh-PressureNoisyPumpHigh-PressureSupplyNoisy" 811. In this example there are three child algorithms "Pressure Controller Pressure Sensor Signal Noisy" is the parent, such as the "PressureController_SNR_Computation," "PressureController_Lowpass-FllterNoiseRemovingLow PassFilter Noise Removing," and "PressureController_CompareSNR LE Compare that computed Signal Noise Ratio is less than constant" 821.

FIG. 9 is an exemplary GUI 900 that illustrates data from an exemplary loadable configuration file 185 for the pressure controller and includes a window 910 illustrating specific configuration data for the "PressureController_SNR_Computation" 921 child algorithm. Window 910 lists the input variables, output variables and the sequence of the algorithm.

Figure 10:
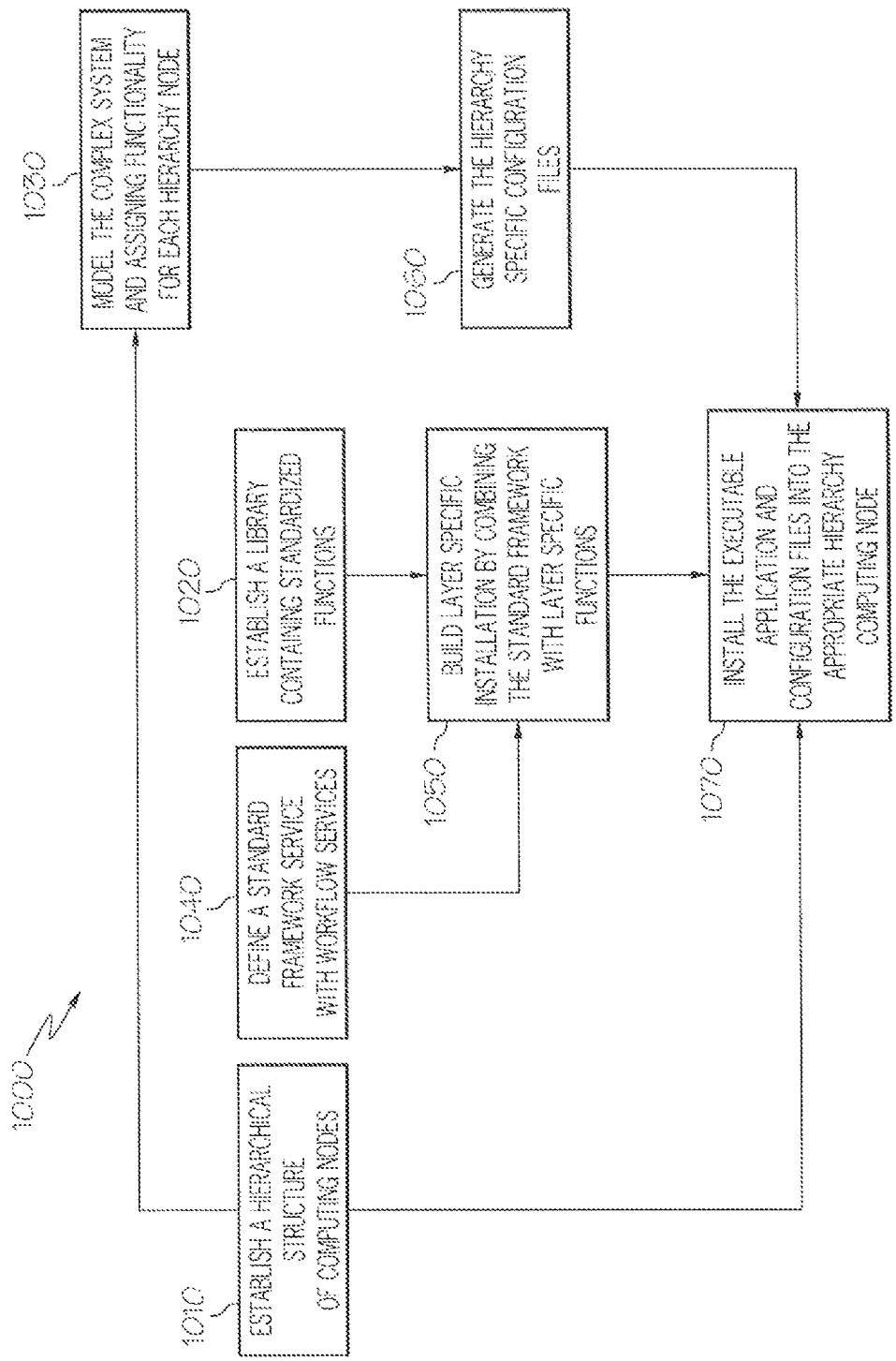
FIG. 10 is a flow diagram of an exemplary method for configuring/reconfiguring a hierarchical structure of computing nodes that are monitoring various components of the complex system.

FIG. 10 is a flow diagram of an exemplary method 1000 for configuring/reconfiguring a hierarchical structure 200 comprising computing nodes (120-160) that are monitoring various components of the complex system. There may be any number and any combination of different types of levels of computing nodes.

The method begins by establishing a hierarchical structure 200 of computing nodes at process 1010. The hierarchical structure 200 of computing nodes is determined by the nature and construction of the complex system of concern, as well as the complexity of monitoring of the complex system that is required. As discussed above, in some embodiments there may be one or more computing nodes (120'-160') associated with each component, with each sub-system and/or with the overall complex system. In addition, there may be a computing node (120'-160') associated with a higher maintainer layer (150), as well as with a general enterprise layer (160). One computing node (120'-160') may be physically and electronically different from another computing node on the same layer (120-160) or on a different level. In other embodiments, a computing node may be identical to all other computing nodes. FIG. 4 is an exemplary screen shot of GUI 170 (See FIG. 2) that allows a user to establish parent and child nodal relationships according to the complex system model.

At process 1040, a standardized framework executive module 301 is created and defined with the desired framework services (302-310). The framework service module 301 is populated to all of the hierarchical computing nodes (120'-160').

At process 1020, the libraries 220-260 of standardized executable applications are developed and established. As discussed above, each standardized executable function (221-264) is written to perform a standard class of functionality such as acquiring data, trending data and reporting data.

At process 1050, a system user 210 populates each computing node (120'-160') with one or more of the standardized executable applications (221-264) and the standardized framework executive module 301. The number and combination of standardized executable applications populated within in a particular computing node (120'-160') is entirely within the discretion of the system designer based on the functionality or potential functionality desired. A standardized executable application (221-264) may be populated or removed from a computing node (120'-160') by any suitable means known in the art. Non-limiting examples of some means for populating a computing node (120-160) includes a maintenance load, a local data loader and loading via a network and communication system 9.

At process 1030, the complex system is modeled on the data modeling tool 171. Each computing node (120'-160') is identified and associated with a particular component, subcomponent and subsystem as may be desired to accomplish a particular level of monitoring. Each computing node (120'-160') is assigned a particular set of standardized executable applications (221-264) that will be required to accomplish the desired monitoring functionality of the computing node (see, FIG. 4).

At process 1060, a plurality of configuration files 185 are created by a user 210. A configuration file 185 comprises a static data portion (SDS) 350a and a dynamic data portion (DDS) 350b. Configuration files 185 contain a collection of editable data specific logic sequences that generate messages and data that are used by the workflow service module 310 to respond to the receipt of data and messages from a SEAM to perform a specific function. For example, a SEAM X communicates to the workflow service module 310 that it has completed a task. The workflow service module 310 retrieves the next action from the configuration file and then commands the next SEAM Y to execute its standardized function with specific data. In other words, a configuration file contains specific data values and programming relationships/functions between data values to enable/disable and to configure each standard executable application to accomplish a special purpose(s). In equivalent embodiments, the editable data specific logic sequences contained in a configuration file may be a collection of state machines.

Thus, the configuration files provide the information that allows the SEAMs to operate and to interact with each other. Specifically this interaction is controlled via the workflow service which obtains all of its directives from the configuration files 185 to enable or disable functionality of the SEAMs as well as provide processing of data within the node (120-160). The same SEAMs may be used in all nodes because the configuration files 185 and the workflow service module 310 direct the execution of the SEAMs within a node and provides the ability to move functionality between nodes.

The configuration files 185 contain the definition of each node (120'-160'). This includes the information that a given node will process, how the node interacts with other nodes and special operations that are run within a given node. The configuration files contain the information to process data, generate signals, diagnose failures, predict failures, monitor usage, monitor consumption and otherwise support maintenance, operation and data analysis.

For example, the configuration files specify other node(s) that a node can interact with (See, FIG. 5, #501), specify signals that a node can process (See, FIG. 5, #502), specify symptoms (See, FIG. 6, #601), specify transmitted data (See, FIG. 6, #602) and received data. The configuration files also specify algorithms that can be preformed by this node (See, FIG. 9, #900), specify how to interpret or process data, specify actions to perform on incoming data or processed data, and specify how to interact with other nodes and user interface devices.

Hence, a computing node (120'-160') populated with standardized executable applications (221-264) becomes a special purpose computing node capable of performing a variety of specific tasks based on its population of executable applications and their subsequent direction by configuration files 185. FIGS. 5-9 are exemplary screen shots of the GUI 170 that may be used by a system designer to configure an exemplar computing node such as VHM 140' to perform one of more specific functions.

Should a system user 210 desire to add specific functions, delete specific functions or redefine specific functions for a particular computing node (120'-160') in the hierarchical structure 200, the configuration file 185 for a particular executable application (221-264) in a particular computing node (120'-160') is modified within the KMS master database 180 as may be desired at process 1060 and then regenerated and installed at its associated computing node (120'-160') at process 1070. Thus, specific functionality formerly resident in one computing node (120'-160') may be added, deleted, modified or it may be moved to another computing node in any other hierarchical level.

For example, data "Trending" functionality being accomplished by an EHM 120' associated with the temperature of a particular component may be shifted from the EHM 120' to the VHM 140' by adding the standardized "Trending" executable application to the VHM 140' (or by enabling a dormant "Trending" functionality already in place) and then configuring the "Trending" executable application in the VHM to perform the operation. To complete the process, the Trending functionality in the EHM 120' may be changed to remove the temperature trending functionality or to disable the Trending executable application. Further, the temperature data from the component is redirected to the VHM 140' via the communication system 9. As such, the data being trended at the EHM 120' may be still acquired and analyzed at the EHM 120' but then sent from the EHM to the VHM 140' for trending.

As discussed above, the various SEAMs (221-264) that may be populated within a particular computing node (120'-160') may each perform a specific function(s) when operated in conjunction with its corresponding configuration file 185. The communication/data transfer between each of the SEAMs (221-264) and the configuration file 185 is coordinated by the workflow service module 310.

Figure 11:
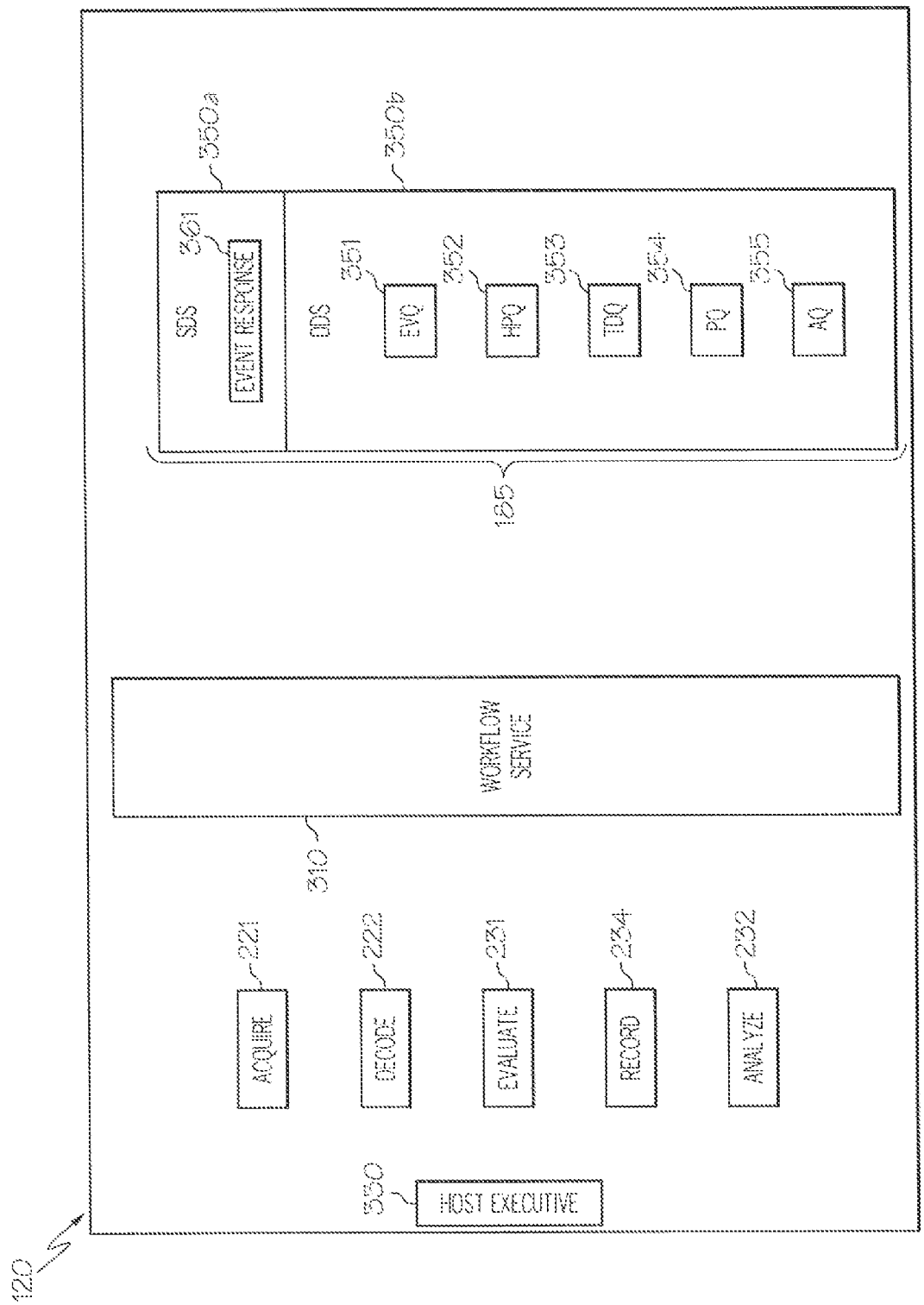
FIGS. 11 and 12 are simplified block diagrams of an exemplary computing node, such as an EHM, according to embodiments.
Figure 12:
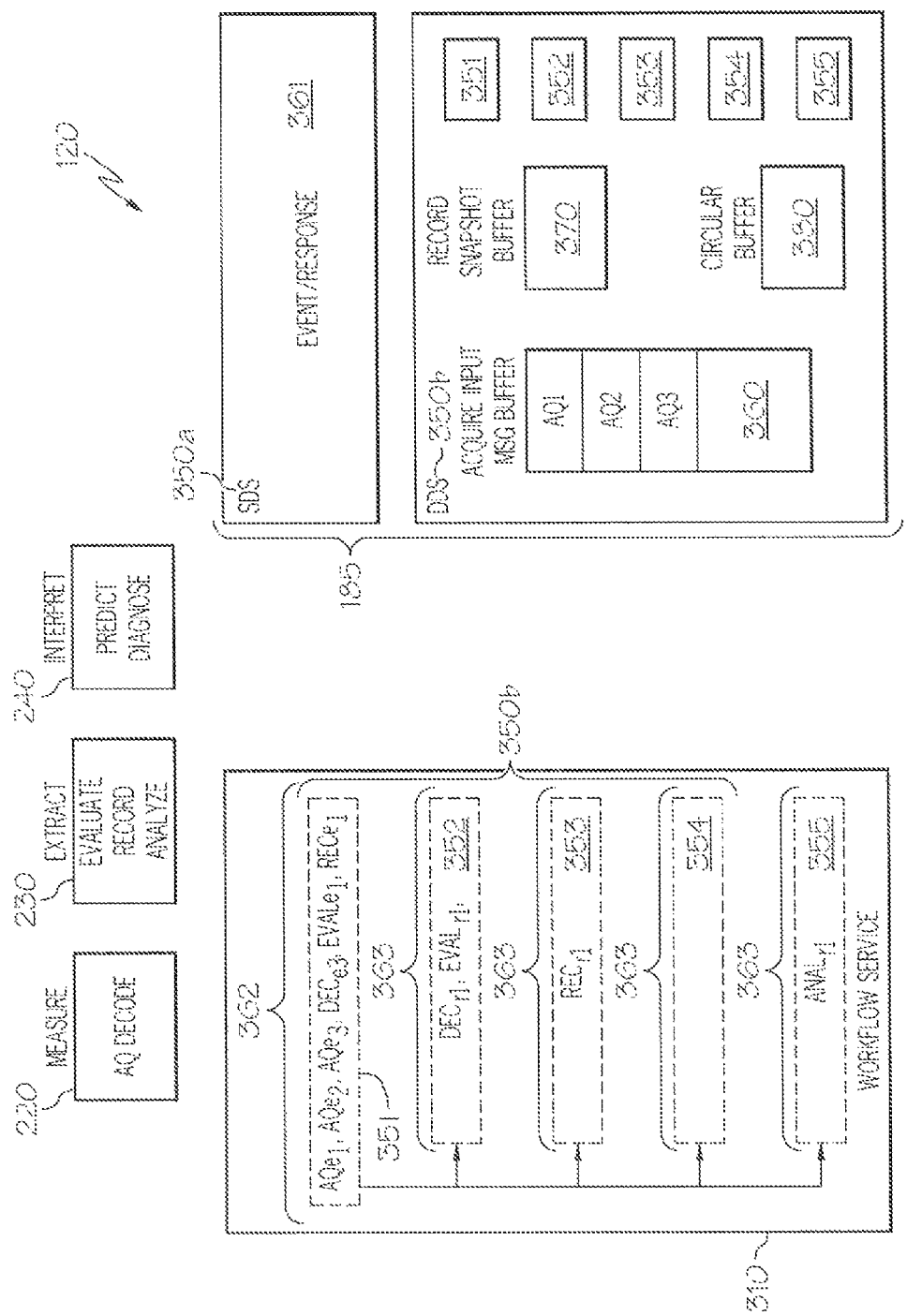

FIGS. 11 and 12 are simplified block diagrams of an exemplary computing node (120'-160'), which here happens to be an EHM 120'. Each computing node (120'-160') utilizes its own host executive software 330. The host executive software 330 executes the normal operating functions of the host EHM 120', but may also provide a platform for hosting the health maintenance functions residing in any SEAM (221-264) populating the computing node.

As described above, there are 24 SEAMs (221-264) disclosed herein. However, other SEAMs with additional functionalities may be included. As such, any discussion herein is intended to extend to any SEAMs that may be created in the future. However, in the interest of brevity and clarity of the following discussion, the number of SEAMs (221-264) has been limited to an Acquire SEAM 221, a Decode SEAM 222, Evaluate SEAM 231, a Record SEAM 234 and an Analyze SEAM 232 as these SEAMs may be viewed as providing some basic functionality common to each SEAM resident in each computing node (120'-160') of the hierarchy.

In addition to the SEAMs (221-264), each computing node (120'-160') also includes a configuration file 185 and a workflow service module 310. The configuration file 185 comprises the DDS 350*b* and the SDS 350*a*. Among other data structures, the DDS 350*b* may comprise an Event Queue (EVQ) 351, a High Priority Queue (HPQ) 352, a Time Delayed Queue (TDQ) 353, a Periodic Queue (PQ) 354 and an Asynchronous Queue (PQ) 355. However, it will be appreciated by those of ordinary skill in the art that the number of queues, their categorization and their priority may be defined and redefined to meet the requirements of a particular application.

Referring to FIG. 12, the DDS 350*b* may also include at least one message buffer 360 for each SEAM (221-264) that has been populated into the EHM 120'. However, in some embodiments only SEAMs within the Measure Library may have a message buffer. The DDS 350*b* may also include a number of record snapshot buffers 370 and circular buffers 380 that store particular dynamic data values obtained from the complex system to be used by the various SEAMs (221-264) for various computations as provided for by the configuration file 185. The data stored in each of the message buffers 360, snapshot buffers 370 and circular buffers 380 is accessed using a data accessor (304) which may be any suitable data accessor software object known in the art. The particular data structure and the location in the DDS 350*b* for the message buffers 160, circular buffers 380 and snapshot buffers 370, are predetermined and are established in a memory device at run time.

The SDS 350*a* is a persistent software object that may be manifested or defined as one or more state machines 361 that map a particular event 362 being read by the workflow service module 310 from the Event Queue (EVQ) 351 to a particular response record 363 (i.e., an event/response relationship). The state machine 361 then assigns a response queue (352-355) into which the response record 363 is to be placed by the workflow service module 310 for eventual reading and execution by the workflow service module 310. The structure and the location of the persistent data in the SDS 350*a* is predetermined and is established in a memory device at run time.

Events 362 may be received into the EVQ 351 in response to a message from an outside source that is handled by the customized adapter 325 of the computing node (120'-160'), as directed by the host executive software 330. Events 362 may also be received from any of the populated SEAMs (221-264) resident in the computing node (120'-160') as they complete a task and produce an event 362.

In the more basic SEAMs such as Sense 223, Acquire 221, Decode 222 and Evaluate 231, the event/response relationships stored within the SDS 350*a* do not tend to branch or otherwise contain significant conditional logic. As such, the flow of events 362 and response records 363 is relatively straight forward. However, more sophisticated SEAMs such as Coordinate 252, Forecast 255 and Respond 261 may utilize sophisticated algorithms that lead to complicated message/response flows and will not be discussed further herein the interest of brevity and clarity.

As an operational example, the host executive software 330 may push an input message into an EHM 120' that is received from an outside source. The host executive software 330 calls a customized adapter 325 which in turn calls the appropriate SEAM (221-264) resident in the EHM 120' based on data included in the message. For Example, the called SEAM may be the Acquire SEAM 221. When called, the Acquire SEAM 221 places the input message into a message buffer 360 (e.g., the Acquire input message buffer), generates an event 362 and places the event into the EVQ 351. The event 362 may contain data about the complex system from another node or from a local sensor. In the interest of simplicity and clarity of explanation, this first event 362 will be assumed to be an "acquire data" message and the event 362 generated from the input message will be referred to herein as $AQe_1$. In other embodiments the input message $AQ_1$ may be generated by a SEAM (221-264) and the event $AQ_{e1}$ pushed into the EVQ 351 by the SEAM.

Once the input message $AQ_1$ is placed in a message queue 360 and its corresponding event 362 is placed into the EVQ 351, then the Acquire SEAM 221 exits and returns control to the workflow service module 310 via return message 364. In this simple example, only a single processor processing a single command thread is assumed. Thus, while the processor is executing a particular SEAM (221-264), the workflow service module 310 and no other SEAMs are operating. Similarly, while the workflow service module 310 is being operated by the processor, no SEAMS (221-264) are in operation. This is because all steps in the operation are performed sequentially. However, in other embodiments, multiple processors may be used, thereby permitting multiple threads (i.e., multiple workflow service modules 310) to be operated in parallel using the same populated set of SEAMs (221-264) and the same configuration file 185.

Upon receiving the return 364 (See, FIG. 13), the workflow service module 310 resumes operation and reads event $AQ_{e1}$ first in this example because event $AQ_{e1}$ is the first event 362 in the EVQ 351. This is so because the EVQ 351 is the highest priority queue and because the workflow service module 310 may read events sequentially in a first-in-first-out (FIFO) manner. Therefore those of ordinary skill in the art will appreciate that any subsequent events stored in the EVQ 351 would be read in turn by the workflow server on FIFO basis. However, reading events in a FIFO manner is merely exemplary. In equivalent embodiments, the workflow service module may be configured to read events in some other ordinal or prioritized manner.

Once event $AQ_{e1}$ is read, the workflow service module 310 consults the persistent data structures in the SDS 350*a* to determine the required response record 363 to the event $AQ_{e1}$. The response record 363 provided by the SDS 350*a* may, for example, be a decode response record $DEC_{r1}$ that directs the Decode SEAM 222 to process the data received from the input message $AQ_1$, which is now stored in a storage location in the DDS 350*b*. The SDS 350*a* also directs the workflow service module 310 to place the response record $DEC_{r1}$ into one of the response queues 352-355, such as HPQ 352, and assigns the location in the response queue in which to place the response based on an assigned priority. The SDS 350*a* may determine the appropriate queue and its priority location in the queue based on the input message type, the data in the input message and on other data such as a priority data field. The workflow service module 310 places the response record $DEC_{r1}$ into the HPQ 352 at the proper prioritized location and returns to read the next event in the EVQ 351.

Because the EVQ 351 is the highest priority event/response queue, the workflow service module 310 continues reading events 362 and posts responses records 363 until the EVQ is empty. When the EVQ 351 is empty, the workflow service module 310 begins working on response records 363 beginning with the highest priority response queue (352-355), which in this example is the HPQ 352.

The first prioritized response record in HPQ 352 in this example is the $DEC_{r1}$ response (i.e., a Decode response). When read, the workflow service module 310 calls (via call 365) a response handler interface of the decode SEAM 222 for the Decode SEAM to operate on the data referenced in the $DEC_{r1}$ response record 363.

After being called by the workflow service module 310, the Decode SEAM 222 consults the SDS 350a with the response record $DEC_{r1}$ to determine what operation it should perform on the data associated with $DEC_{r1}$ and performs it. As disclosed above, a SDS 350a maps the event $DEC_{r1}$ to a predefined response record 363 based on the message type and the data referenced within $DEC_{r1}$. Data associated with event $DEC_{r1}$ may reside in any of the record snapshot buffers 370, circular buffers 380, or the data may have to be queried for from a source located outside the exemplary EHM 120'.

The Decode SEAM 222 operates on the data and generates an event 362 and places the event into the EVQ 351 and a message into the message queue 360. For example, the response record 363 generated by the Decode SEAM 222 may be $EVAL_{e1}$ indicating that the next process is to be performed by the Evaluate SEAM 231. The Decode SEAM 222 then exits and sends a return message 364 back to the workflow service module 310 to resume its operation. The process begins anew with the workflow service module 310 reading the EVQ 351 because there are now new events (including $EVAL_{e1}$) that have been added to the queue.

Figure 13:
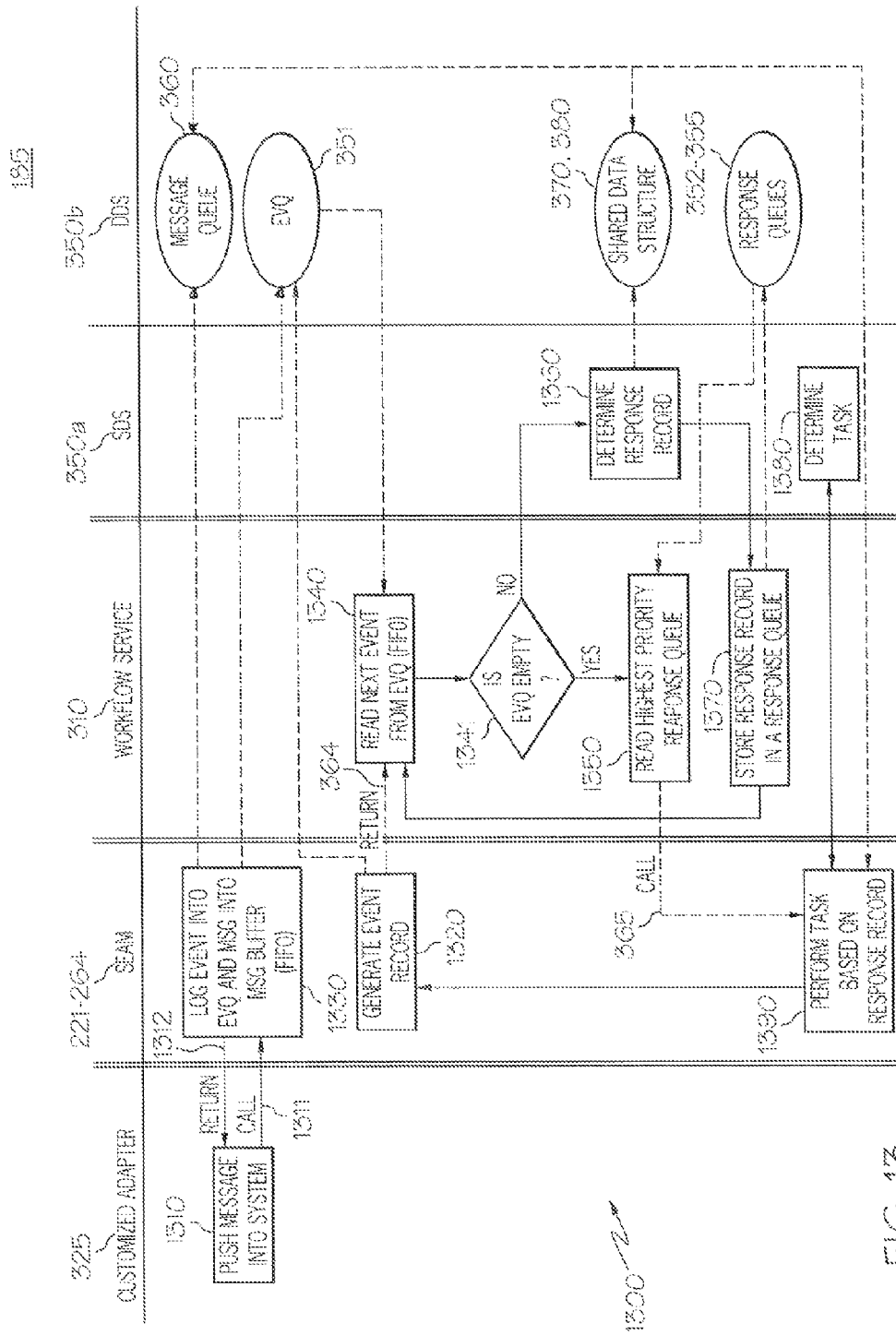
FIG. 13 is a simplified logic flow diagram of an exemplary method for coordinating functions of a computing device to accomplish a task according to embodiments.

In the normal course, the work flow service module 310 eventually reads event $EVAL_{e1}$ and consults the SDS 350a to determine the proper response record 363 and which response queue to place it and in what priority within the response queue. In this example the response $EVAL_{r1}$ is also place in the HPQ 352 and is in first priority because the response record $DEC_{r1}$ would have already been operated on and dropped out of the queue. The workflow service then reads the next event from the EVQ 351, and the process continues FIG. 13 is a simplified flow chart of a method 1300 for coordinating the operation of various SEAMs (221-264) within a computing node (120'-170'). However, those of ordinary skill in the art will appreciate that the use of multiple processors will allow for multiple threads to be processed in parallel.

At process 1310, an event 362 is pushed into the system by the customized adapter 325 or, in the case of some EHMs 120' by the host executive software 330. In some embodiments, the host executive 330 may make a function call 1311 to a SEAM (221-264) to accept the event message such as the Acquire SEAM 221. At process 1330, the event record 362 is placed into the EVQ 351 by the called Seam (221-264) in the order in which it was received and the input message is stored in a queue or a message buffer 360 resident in the DDS 350b by the SEAM (221-264). The SEAM (221-264) then sends a return command 1312 to the customized adapter 325 and exits.

It is assumed in this simple example, the workflow service module 310 had no other events or response records to process. Therefore the workflow service module 310 may restart at process 1340, although it may restart at any point in its routine. At process 1340, the workflow service module 310 attempts to read the next event record in FIFO order from the EVQ 351. If it is determined that the EVQ 351 is not empty at decision point 1341, then the workflow service module 310 reads the next event 362 from the EVQ and then consults the persistent data (e.g., a state machine) in the SDS 350a with the event 362.

At process 1360, the SDS 350a receives the event 362 as an input and produces a predefined response record 363. The SDS 350a also indicates the response queue (352-355) into which the response record 363 is to be placed, and indicates a priority location for the response record in the response queue as. Any data associated with an event/response record is stored in a shared data structure in the DDS 350b, such as in a circular buffer 380 or in a record snapshot buffer 370.

At process 1370, the workflow service module 310 stores the response record 363 into the assigned response queue (352-355) in its priority order and then returns to process 1340 to read the next event 362.

When the SDS 350a assigns response queues, the highest priority response records 363 are placed in the HPQ 352 in their order of assigned priority and not on a FIFO basis. Response records 363 of lesser priority, such as responses records requiring a time delay may be placed in the TDQ 535. Responses records 363 of still lesser priority may be placed in the PQ 354. Such response records 363 in the PQ 354 may need to be addressed only on a periodic basis, for example. Response records 363 of the least priority are assigned to the AQ 355 and may be addressed asynchronously as the higher priority response queues permit. Further, response records 363 are placed into one of the response queues 353-355 according to a processing priority that is assigned by the SDS 350a and may or may not be placed on a FIFO basis. The above described loop (1340, 1360, 1370) continues for as long as there are events 362 in the EVQ 351.

If the EVQ 351 is determined to be empty at determination point 1341, then the workflow service module 310 proceeds to the highest priority response queue (352-355) that contains a response record 363 and reads the highest priority response record (e.g. the first or the next response record), at process 1350. When a response record 363 is read, the workflow service module 310 issues a function call 365 to the SEAM (221-264) referenced in the response record 363 to perform its function on the data indicated in the response record 363 and then exits.

At process 1380, the called SEAM (221-264) consults the SDS 350a to determine the task to be performed by the SEAM. Although not strictly required for simple SEAM functions such as the Acquire SEAM 221, more complex SEAMs such as the Forecast SEAM 255 or the Coordinate SEAM 252, for example, may have various alternative algorithms or conditional logic that may be performed. As such the SDS 350a, may direct the SEAM as to which explicit functionality or algorithm to execute.

At process 1390, the designated SEAM performs its function or task on the data associated with the response record 363. Once the SEAM 221-264 performs its function, the method 1300 proceeds to process 1320 where a new event record is generated and placed into the EVQ 351 and the method 1300 repeats.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for coordinating functions within a computing device to accomplish a task, comprising:
a plurality of standardized executable application modules (SEAMs), wherein each SEAM is a basic un-modifiable modular software object that is directed to complete specific tasks after being configured by a configuration file, and is configured to execute on a processor to provide a unique function and to generate an event associated with the unique function associated with each SEAM;
a non-transitory computer readable storage medium storing the configuration file recorded thereon, the configuration file comprising: a dynamic data store (DDS) and a static data store (SDS),
wherein the DDS comprises an event queue and one or more response queues and all of the one or more response queues have a lower read priority than the event queue, and
wherein the SDS comprises a persistent software object, the persistent software object configured to map a specific event from the event queue to a pre-defined response record, and to assign a response queue into which the pre-defined response record is to be placed; and
a workflow service module, the workflow service module configured to direct communication among the SDS, the DDS and each of the plurality of SEAMs.

2. The system of claim 1, wherein the one or more response queues are hierarchical such that one response queue has a higher read priority than another.

3. The system of claim 1, further comprising a customized adapter, wherein the event is received from one of a host application via the customized adapter and from one of the plurality of SEAMs.

4. The system of claim 1, wherein the workflow service module is configured to store the event to the event queue and read the event from the event queue.

5. The system of claim 1, wherein when the workflow service module is configured to read the pre-defined response record in each successive response queue in order of their priority.

6. The system of claim 1, wherein the workflow service module is further configured to query the SDS for the pre-defined response record associated with the event and to place the pre-defined response record into the indicated pre-defined response queue.

7. The system of claim 5, wherein when a new event is received into the event queue the workflow service module terminates reading any pre-defined response messages and reads the new event.

8. The system of claim 1, wherein when the workflow service module calls one of the plurality of SEAMs after reading a response record in the highest priority response queue.

9. A method for coordinating functions of a computing device to accomplish a task, comprising:
storing a plurality of standardized executable application modules (SEAMs) within the computing device, wherein each SEAM is a basic un-modifiable modular software object that is directed to complete specific tasks after being configured by a configuration file, and is configured to execute a unique function among the plurality of SEAMs and to generate an event associated with each SEAM's unique function;
installing the configuration file into the computing device, the configuration file comprising a dynamic data store (DDS) and a static data store (SDS),
wherein the DDS comprises an event queue and one or more response queues and all of the one or more response queues have a lower read priority than the event queue, and
wherein the SDS comprises a state machine, the state machine configured to map a specific event to a predefined response record and indicating a response queue into which the predefined response record is to be placed, and
storing a workflow service module, the workflow service module configured to direct data communication among the SDS, the DDS and each of the plurality of SEAMs.

10. The method of claim 9, wherein the one or more response queues are hierarchical such that one response queue has a higher read priority than another.

11. The method of claim 10, wherein the workflow service module reads events serially from the event queue.

12. The method of claim 10, wherein the event queue receives events from each of the plurality of SEAMs.

13. The method of claim 11, wherein the workflow service module inputs an event read from the event queue as a query to the SDS and receives a response record and an indication of one of the one or more response queues into which to store the response record.

14. The method of claim 13, wherein the workflow service module calls one of the plurality of SEAMs based on a content of the response record stored.

15. The method of claim 14, wherein the called SEAM performs its unique function on data referred to in the response record and posts a second event into the event queue.

16. The method of claim 13, wherein the workflow service module proceeds to read another event on the FIFO basis.

17. The method of claim 11, wherein when the event queue is empty, the workflow service module proceeds to read a first response record from a highest priority response queue containing a response record.

18. The method of claim 17, wherein the workflow service module queries the SDS with the first response record and receives a second response record and an indication of one of the one or more response queues into which to store the second response record.

19. The method of claim 17, wherein the workflow service module calls one of the plurality of SEAMs based on a content of a second response record stored the response queue.

20. A method for coordinating functions of a single computing device to accomplish a task, comprising:
storing a plurality of standardized executable application modules (SEAMs) within the single computing device, wherein each SEAM is a basic un-modifiable modular software object that is directed to complete specific tasks after being configured by a configuration file, and is configured to execute a unique function among the plurality of SEAMs and to generate an event associated with each SEAM's unique function;
determining when an event queue stored on a memory device in the single computing device is empty;
when the event queue is not empty, reading an event from the event queue of the computing device;

requesting a response record from a memory location in the single computing device based on the event;
storing the response record in a response queue within the single computing device;
when the event queue is empty, reading a response record from the response queue; and
making a function call to an application identified in the response record, wherein the response queue has a lower read priority than the event queue.

* * * * *